(12) United States Patent
Winterauer et al.

(10) Patent No.: US 12,530,741 B2
(45) Date of Patent: Jan. 20, 2026

(54) SYSTEMS AND METHODS FOR REAL-TIME PREVIEW OF HYPERSPECTRAL DATA DURING DATA ACQUISITION

(71) Applicant: Bruker Optics GmbH & Co. KG, Ettliingen (DE)

(72) Inventors: Dominik Winterauer, Perl (DE); Roland Harig, Ettlingen (DE); Niels Kroeger-Lui, Ettlingen (DE)

(73) Assignee: Bruker Optics GmbH & Co., KG, Ettlingen (DE)

( * ) Notice: Subject to any disclaimer, the term of this patent is extended or adjusted under 35 U.S.C. 154(b) by 306 days.

(21) Appl. No.: 18/345,721

(22) Filed: Jun. 30, 2023

(65) Prior Publication Data
US 2025/0005713 A1  Jan. 2, 2025

(51) Int. Cl.
 G06T 7/00  (2017.01)
 G06T 5/20  (2006.01)
 G06T 5/50  (2006.01)
 G06T 7/13  (2017.01)

(52) U.S. Cl.
 CPC ............... G06T 5/20 (2013.01); G06T 5/50 (2013.01); G06T 7/13 (2017.01); *G06T 2207/10036* (2013.01); *G06T 2207/10048* (2013.01); *G06T 2207/20216* (2013.01)

(58) Field of Classification Search
 CPC .... G06T 5/20; G06T 5/50; G06T 7/13; G06T 2207/10036; G06T 2207/10048; G06T 2207/20216; G06T 5/70
 See application file for complete search history.

(56) References Cited

U.S. PATENT DOCUMENTS

2023/0194424 A1* 6/2023 Niemöller ................ G01J 3/28
 250/339.09

OTHER PUBLICATIONS

A. Savitzky et al.: "Smoothing and Differentiation of Data by Simplified Least Squares Procedures," Analytical Chemistry, vol. 36, No. 8, Jul. 1964, pp. 1627-1639.
(Continued)

*Primary Examiner* — Kent Yip
(74) *Attorney, Agent, or Firm* — Brake Hughes Bellermann LLP

(57) ABSTRACT

Real-time preview of hyperspectral data during data acquisition is provided, in which the hyperspectral data represents chemical and/or physical properties of a sample and is represented by a set of channel images. For each channel image of the set, an edge score is determined using a plurality of edge kernels, a noise score is determined using a noise kernel, and a contrast score is determined for the channel image based on the ratio of the determined edge score to the respective determined noise score. Channel images are selected in descending order of associated contrast scores, as a plurality of high contrast candidate images. One or more augmented candidate images are generated by applying one or more augmentation methods, and a contrast score is determined for each augmented candidate image. The candidate image with the highest contrast score is provided as preview image during data acquisition.

19 Claims, 15 Drawing Sheets

(56) References Cited

OTHER PUBLICATIONS

P. Viola et al.: "Rapid Object Detection Using a Boosted Cascade of Simple Features," In Proceedings of the 2001 IEEE Computer Society Conference on Computer Vision and Pattern Recognition, CVPR 2001, (vol. 1, pp. I-I), Feb. 2001, 12 pages.

R. Lienhart et al.: "An Extended Set of Haar-like Features for Rapid Object Detection," In Proceedings. international conference on image processing, vol. 1, Sep. 2002, 4 pages.

* cited by examiner

SYSTEMS AND METHODS FOR REAL-TIME PREVIEW OF HYPERSPECTRAL DATA DURING DATA ACQUISITION

TECHNICAL FIELD

The present description generally relates to spectroscopic measurements of samples, and more particularly relates to real-time preview of hyperspectral data during data acquisition reflecting the chemical and/or physical properties of sample being subject to hyperspectral analysis.

BACKGROUND

Hyperspectral datasets can be obtained from a sample using known scanning techniques, such as spatial scanning, spectral scanning, snapshot imaging, or spatio-spectral scanning. A hyperspectral dataset typically includes information as a set of 'images', or as a set of 'spectra'. Each image represents the spatial distribution of amplitudes of electromagnetic interaction (scattering, e.g., absorbance, reflectance) of the sample at a narrow wavelength (or frequency) range of the electromagnetic spectrum, also known as a spectral band. Similarly, a spectrum contains the amplitudes of the same type of electromagnetic interaction for a multitude of spectral bands probed on a localized area of the sample around known Cartesian coordinates (e.g., (x, y)). These 'images', when stacked on top of each other, or these 'spectra', when aligned next to each other according to their Cartesian coordinates, form a three-dimensional hyperspectral dataset for processing and analysis that can be indexed by triplets $(x,y,\lambda)$, where x and y represent two spatial coordinates of the acquisition process (pixel position or probing coordinates), and $\lambda$ represents the spectral dimension (comprising a range of wavelengths or frequencies).

In a digital measurement apparatus, the wavelength or frequency labels of such images are discrete. More general, a hyperspectral dataset is commonly represented as an N-dimensional discrete array, where each dimension corresponds to a physical or derived quantity and each index along a certain dimension is associated with a fixed value or range of its corresponding quantity (e.g., time, spatial coordinate, frequency etc.). The entries of the array are the response values obtained from a respective spectral measurement apparatus. In a hyperspectral dataset represented as a discrete array, the indices along at least one dimension indicate values of frequency, wavelength, or energy per quantum of some type of radiation. Such a dimension is called a spectral dimension. If the hyperspectral data array has only one spectral dimension, a sub-array obtained by the response values sharing an identical spectral index is called a single band image or single channel image. The dimensionality of a single channel image depends on the number of varying co-recorded physical quantities and may be 0 (single spectrum, no varying co-recorded physical quantities), 1 (e.g., line measurement (one varying spatial coordinate), time series (one varying temporal coordinate)), 2 (e.g., 2D map (two varying spatial coordinates)), 3 (e.g., volumetric measurement (three varying spatial coordinates)) or higher (any possible direct product of physical quantities). That is, a hyperspectral dataset contains a set of measured intensity values for each point on the grid of physical parameters (e.g., a pixel for a 2D map). Each of these measured intensity value sets is tagged with a series of frequency or wavelength labels corresponding to the spectral properties of the acquisition and the value of one or more other co-recorded physical quantities (containing information about the ambient conditions under which this intensity value was obtained (e.g., x, y, and/or z coordinate for extended 2d and/or 3d imaging, temperature, time)). In the following, the description refers to wavenumbers as representations of corresponding frequency, wavelength, or energy per quantum values.

Prior art solutions for preview of hyperspectral data typically require the manual selection of one or more frequency bands whose measured intensity values are summed up or otherwise combined. In one prior art approach, frequency bands are selected manually. However, the manual selection of frequency bands already requires a priori knowledge of the chemical and physical properties of the sample that may not be available at the time the measurement (data acquisition) commences. In another prior art approach, a frequency band having a maximum in the sum of all intensity values of channel images is selected for display. However, very often channel images selected with this maximum approach do not show the sample's chemical or physical properties of interest.

SUMMARY

It is therefore a challenge to provide a fast and high-contrast live preview of hyperspectral data during data acquisition showcasing the chemical and physical properties of a sample. This technical problem is solved by the features of a computer-implemented method, a computer system and a computer program product as defined by the independent claims. The underlying concept of the technical solution to the problem is to score each single channel image of a hyperspectral dataset based on its contrast and then only use single channel images with high contrast to generate a live preview or to identify relevant frequencies for image based hyperspectral imagery. The determination of the contrast of each single channel image is based on convolutions of the respective single channel image with a set of pre-defined filters/kernels as described in more detail below.

In one embodiment, a computer-implemented method is provided for real-time preview of hyperspectral data during data acquisition. The term real-time, as used herein, refers to the generation of a preview image with a near-real-time system response (e.g., to enable an operator to react properly, in time and possibly proactively). Near-real-time system response, as used herein, means that a computation in response to the obtained hyperspectral data is only delayed by the time delay introduced, by automated data processing or network transmission, between the occurrence of an event and the use of the processed data, such as for display or feedback and control purposes. For example, a near-real-time display depicts an event or situation as it existed at the current time minus the processing time, as nearly the time of the live event. The method can be executed by a computer system, such as a general-purpose computer. The hyperspectral data represent chemical and/or physical properties of a sample represented by a set of channel images. The single channel images can be either obtained directly as recorded images during the data acquisition in case of using an image-based measurement method. Some measurement methods measure a grid map of spectra from which a person skilled in the art can also easily derive the corresponding channel images. Each channel image is associated with a particular wavelength ($\lambda$), or frequency, or energy per quantum. Examples in the following description always refer to the wavelength (or wavenumber) without any intention to limit the scope of the claims. Each single channel image in the hyperspectral dataset typically contains the same number of measured intensity values spanning identical grids for each spectral channel on the space of the co-recorded physical quantities (e.g., identical x and y positions).

In a basic embodiment, the shape and even the dimensionality of the various single channel images in the dataset may differ. This basic embodiment, which does not use image augmentation methods for generating high contrast candidate images, is flexible enough to handle such differing channel images, as long as each single channel image is a collection or composition of one or more rectangular images/grids exceeding a minimum size.

Hyperspectral data may be registered with a point detector, line detector, or a focal plane array detector, acquiring a 0D (single point), 1D (line), and 2D ("area") slice of the data at a time, respectively. These can be used to implement various scanning modes like spectral or spatial scanning. In many practical applications scanning modes are mixed to improve acquisition speed and/or accuracy. One measurement mode commonly employed in one embodiment with focal plane arrays is tile mapping (patch mapping) for hyperspectral maps. In tile mapping, the mapping area (and, correspondingly, the hyperspectral data) is segmented in (slightly overlapping or non-overlapping) rectangular tiles (patches) along the spatial coordinates. The area of a tile on the sample corresponds to the area that can be imaged by the focal plane array detector, and its corresponding extent along the spatial dimension of the hyperspectral data array is the pixel size of the focal plane array (or less, if the tiles are overlapping). Spatial scanning is then performed for each tile area. The resulting hyperspectral data block from a single tile is then merged into the data array built-up from hyperspectral data blocks of previously scanned tiles. Thus, tile mapping works similar to grid mapping, but instead of merging one digital spectrum at a time, N×M spectra are merged into the dataset at a time. N×M can range from 16×16 for small focal plane arrays to more than 600×400 for imaging-based measurement apparatuses like quantum cascade laser-based imaging systems. In more general, a single channel image of a particular hyperspectral dataset may correspond to pixels of a rectangular greyscale digital image representing an area of the sample. Thereby, a particular pixel has the same position relative to the sample in all channel images.

The system obtains the set of channel images based on the data acquired by a measurement device which uses an appropriate detector for either the recording of channel images or the recording of a grid map of spectra. Then, each channel image of the set of images is processed by respective modules of the system performing the following steps a) to c):

a) An edge module determines an edge score for the (currently processed) channel image by performing a plurality of convolutions of the channel image with a plurality of edge kernels adapted to identify edges for a plurality of image directions. Each convolution results in a corresponding edge filter map. The resulting edge filter maps are aggregated to obtain the edge score for the channel image. The number of convolution kernels as well as their shape may be determined dependent on the dimensionality of the channel images.

b) A noise module determines a noise score for the channel image based on a noise filter map obtained by performing a convolution of the channel image with a noise kernel.

c) A contrast module determines a contrast score for the channel image as the ratio of the determined edge score to the respective determined noise score.

In an embodiment where the hyperspectral data is registered with a focal plane array, each channel image may be composed of at least two tiles (patch images). In this implementation, the edge score, the noise score and the contrast score can be determined for each tile separately to avoid contrast artifacts at the boundaries of neighboring tiles. A pairwise mutual spatial correlation of all tiles of each channel image for each spectral channel may be determined and the edge score of each channel image can be adjusted by a factor $(1-c)^k$, where c is the minimum pairwise mutual spatial correlation of that channel image. k is typically in the range of 0 to 5. Advantageously, k=2.5. The contrast score of a previous tile may be calculated during acquisition of a current tile, thereby iteratively calculating the contrast score of the whole channel image.

From the set of channel images, a plurality of channel images is selected, in descending order of associated contrast scores, as a plurality of high contrast candidate images. That is, the channel images are ranked by their contrast scores and, starting with the highest contrast score, a predefined number of the highest ranked channel images is selected as the plurality of high contrast candidate images. In an example embodiment, the predefined number of the highest ranked channel images may be defined as a percentage (quantile) of the total number of captured channel images. A suitable predefined number can be (rounded) one thirtieth of the total number of channels in case of a sufficiently large total number of channels. Further, the predefined number of selected high contrast candidate images should never exceed 50% of the total number of channels and should be at least 20 in cases where the total number of channels is in the range of 40 to 600. For example, if the total number of channels is in the range of 1-39, the predefined number may be set to 50% of the total number of channels. If the total number of channels is in the range of 40 to 600, the predefined number may be set to '20'. If the total number of channels is greater than 600, the predefined number may be set to one thirtieth of the total number of channels. A person skilled in the art can define other predefined numbers (e.g., in the range between 2.5% and 5% in case of a large total number of channels).

From the plurality of high contrast candidate images, in a preferred embodiment, an augmentation module generates one or more augmented candidate images. For each augmented candidate image, a contrast score is determined by the previously described modules. The augmentation module can implement one or more augmentation methods. It is to be noted that at least one augmentation method is used in the preferred embodiment. However, any of the following augmentation methods and any combination thereof can be used for the generation of augmented candidate images. In the basic embodiment, where the different channel images may vary in size and shape, the augmentation module is not present and, therefore, the augmentation methods are not used.

In a first augmentation method, an augmented candidate image can be generated by generating a mean spectrum by averaging all spectra acquired via the set of channel images. Then, searching for one or more peaks in the mean spectrum within a predefined range of wavenumbers. The predefined range of wavenumbers is centered at the wavenumber associated with the channel image with the highest contrast score. If one or more peaks in the mean spectrum are identified within the predefined range of wavenumbers, selecting the peak being closest to the channel image with the highest contrast score. A baseline corrected integral is computed across an integration range of the selected peak:

An ordinary integral of the mean spectrum across an integration range is computed using a method suitable for discrete integration (e.g., trapezoidal rule, Simpson's rule). A baseline contribution is computed as an integral of the straight line (in a suitable coordinate system) connecting the data points of the mean spectrum at the upper and lower end of the same integration range using a method suitable for discrete integration. The baseline corrected integral is then computed as the ordinary integral minus the baseline contribution. The integration range is determined such that the baseline corrected integral has a local maximum. Finally, the baseline corrected integral is computed across the determined integration range for each spectrum acquired via the set to generate a baseline corrected augmented candidate image.

In a second augmentation method, an augmented candidate image can be generated by generating an averaged candidate image as augmented candidate image by averaging the candidate images of the selected plurality of high contrast candidate images.

In a third augmentation method, an augmented candidate image can be generated by generating, from the selected high contrast candidate images for each channel image pixel, an n-dimensional vector with n being the number of selected high contrast candidate images. The vector components represent the intensity values of the respective pixel at the respective wavenumbers. Then, the first principal component of the n-dimensional vectors is computed. The components of the resulting vector of the first principal component represent corresponding weights of the respective channel images. An augmented candidate image is then generated which reflects a score map of the first principal component by computing a weighted sum of the selected high contrast candidate images using the corresponding weights.

In other words, the augmented candidate image can be generated by weighing the n spectral channels of the selected high contrast candidate images. The slices of intensity values along fixed spatial coordinate indices ("pixels") correspond to reduced digital spectra, each of which can be represented as an n-dimensional vector. A loading vector for a first principal component of a set of n-dimensional vectors is then computed as the n-dimensional unit vector that maximizes the variance when said vectors are projected onto the loading vector. A corresponding score map is the projection of the set of vectors onto the corresponding loading vector, which generates a 2D grayscale image if the set of vectors is arranged on a rectangular grid. The score map can be interpreted as a weighted sum of the selected high contrast candidate images, where the weights are given by the elements of the n-dimensional loading vector. A deflated dataset is obtained by subtracting the loading vector times its corresponding score (projection) from each vector of the dataset. Subsequent principal components (second, third, fourth etc.) can then be obtained by repeated application of this procedure on the deflated dataset. The score map of the first principal component is then used as an augmented candidate image.

In a fourth augmentation method, an augmented candidate image can be generated similar to the third augmentation method but using the second principal component in that, from the selected high contrast candidate images for each channel image pixel, an n-dimensional vector is generated with n being the number of selected high contrast candidate images. Again, the vector components represent the intensity values of the respective pixel at the respective wavelengths. Now, the second principal component of the n-dimensional vectors is computed. The components of the resulting vector of the second principal component represent corresponding weights of the respective channel images. An augmented candidate image is generated which reflects a score map of the second principal component by computing a weighted sum of the selected high contrast candidate images using the corresponding weights.

In a fifth augmentation method, an augmented candidate image can be generated by computing the sum of the contrast score maps of the first and second principal components as augmented candidate image.

In a sixth augmentation method, an augmented candidate image can be generated by computing the difference between the contrast score maps of the first and second principal components as augmented candidate image.

In a final step, from the plurality of high contrast candidate images and the one or more augmented candidate images, the candidate image with the highest contrast score is provided as preview image for display during data acquisition.

In the basic embodiment without using augmentation methods, the candidate image with the highest contrast score provided as preview image for display during data acquisition is derived from the plurality of high contrast candidate images only.

In one embodiment, a computer readable medium is provided comprising computer-readable instructions that, when loaded into the memory of a computing device and processed by one or more processors of the computing device, cause the computing device to execute the method steps of the herein disclosed computer-implemented method for real-time preview of hyperspectral data during data acquisition. The hyperspectral data reflects chemical and/or physical properties of a sample and is obtained as a set of channel images. Each channel image is associated with a particular wavelength. In a preferred embodiment, the computing device is caused to execute the method steps:

obtaining the set of channel images;
for each channel image of the set:
 determining an edge score for the channel image by:
  performing a plurality of convolutions of the channel image with a plurality of edge kernels adapted to identify edges for a plurality of image directions, each convolution resulting in a corresponding edge filter map, and aggregating the resulting edge filter maps to obtain the edge score;
 determining a noise score for the channel image based on a noise filter map obtained by performing a convolution of the channel image with a noise kernel;
 determining a contrast score for the channel image based as the ratio of the determined edge score to the respective determined noise score;
selecting from the set, in descending order of associated contrast scores, a predefined number of channel images as a plurality of high contrast candidate images;
generating one or more augmented candidate images by applying one or more augmentation methods to all channel images or to the plurality of high contrast candidate images, and determining a contrast score for each augmented candidate image; and
providing, from the plurality of high contrast candidate images and the one or more augmented candidate images, the candidate image with the highest contrast score as preview image for display during data acquisition.

In a further embodiment, a computer system is provided for real-time preview of hyperspectral data during data acquisition, the hyperspectral data reflecting chemical and/or physical properties of a sample and being represented by a set of channel images, each channel image associated with a particular wavelength, frequency, or energy per quantum corresponding to a particular wavenumber, the system comprising a memory storing computer-readable instructions implementing a plurality of functional modules, and one or more processors of the computing device for executing the computer-readable instructions to instantiate said functional modules for performing the following functions at runtime of the computer system:

obtaining, by using an interface, the set of channel images;

for each channel image of the set:

determining, by an edge module, an edge score for the channel image by: performing a plurality of convolutions of the channel image with a plurality of edge kernels adapted to identify edges for a plurality of image directions, each convolution resulting in a corresponding edge filter map, and aggregating the resulting edge filter maps to obtain the edge score;

determining, by a noise module, a noise score for the channel image based on a noise filter map obtained by performing a convolution of the channel image with a noise kernel;

determining, by a contrast module, a contrast score for the channel image based as the ratio of the determined edge score to the respective determined noise score;

by a selection module, selecting from the set, in descending order of associated contrast scores, a predefined number of channel images as a plurality of high contrast candidate images;

generating, by an augmentation module, one or more augmented candidate images by applying one or more augmentation methods to all channel images or to the plurality of high contrast candidate images, and determining a contrast score for each augmented candidate image; and by a high score module, providing, from the plurality of high contrast candidate images and the one or more augmented candidate images, the candidate image with the highest contrast score as preview image for display during data acquisition.

It is to be noted that embodiments of the computer system may instantiate further functional models to perform further steps as disclosed herein.

Further aspects of the description will be realized and attained by means of the elements and combinations particularly depicted in the appended claims. It is to be understood that both, the foregoing general description and the following detailed description are exemplary and explanatory only and are not restrictive.

DETAILED DESCRIPTION

Figure 1:
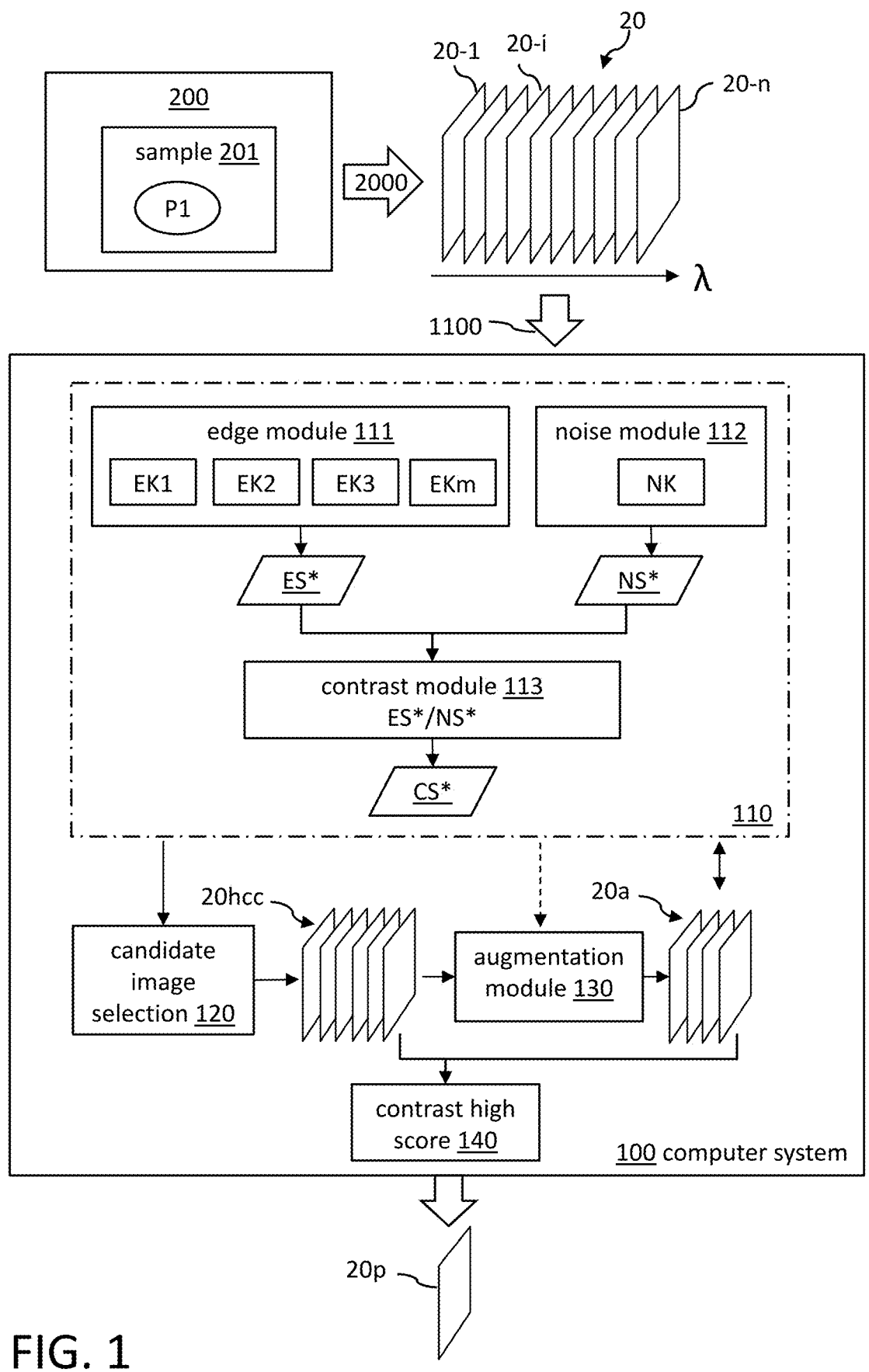
FIG. 1 is a block diagram illustrating a computer system for real-time preview of hyperspectral data during data acquisition according to an embodiment.
Figure 5B:
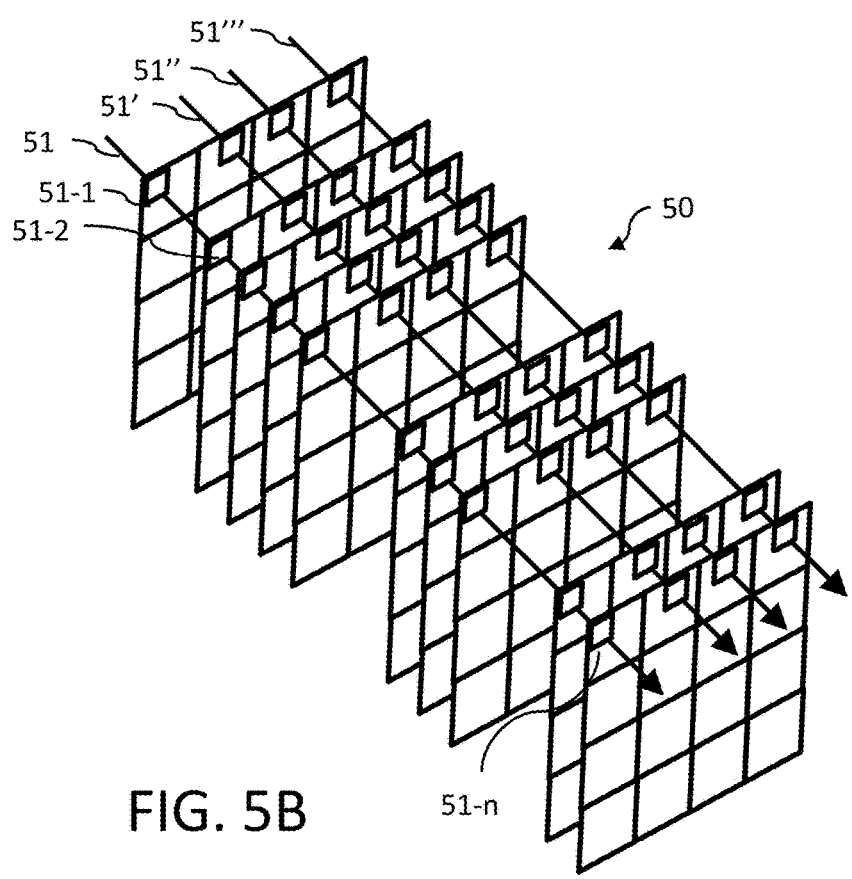
FIG. 5B illustrates a hyperspectral data set with channel images for a plurality of wavenumbers.

FIG. 1 shows a block diagram of a computer system 100 for real-time preview of hyperspectral data during data acquisition. The hyperspectral data represents chemical and/or physical properties P1 of a sample 201 and are obtained 2000 by a respective spectrometer 200 represented by a set 20 of channel images 20-1 to 20-n. Each channel image 20* is associated with a particular wavelength, frequency or energy per quantum (corresponding to wavenumber λ). In other words, the spectrometer 200 is recording data underlying the channel images of the sample at different wavelengths. Each single channel image in a hyperspectral dataset typically contains the same number of measured intensity values spanning identical grids on the space of co-recorded physical quantities for a particular wavelength. In other words, identical x and y positions in the various channel images (e.g., the upper left pixel of each image) typically relate to the same physical sample location. Turning briefly to FIG. 5B, a plurality 50 of single channel images of a particular hyperspectral dataset is shown. For example, the upper left pixel of each channel image represents the same position relative to the sample for different wavenumbers. The intersections of arrow 51 with the channel images indicate the different spectral values for said pixel over the respective wavenumbers. In other words, pixels at corresponding locations in different channel images relate to different wavenumbers. That is, there is a particular wavenumber assigned to each image. In the previously described basic embodiment, channel images of the hyperspectral dataset may even vary in size and shape.

Figure 2:
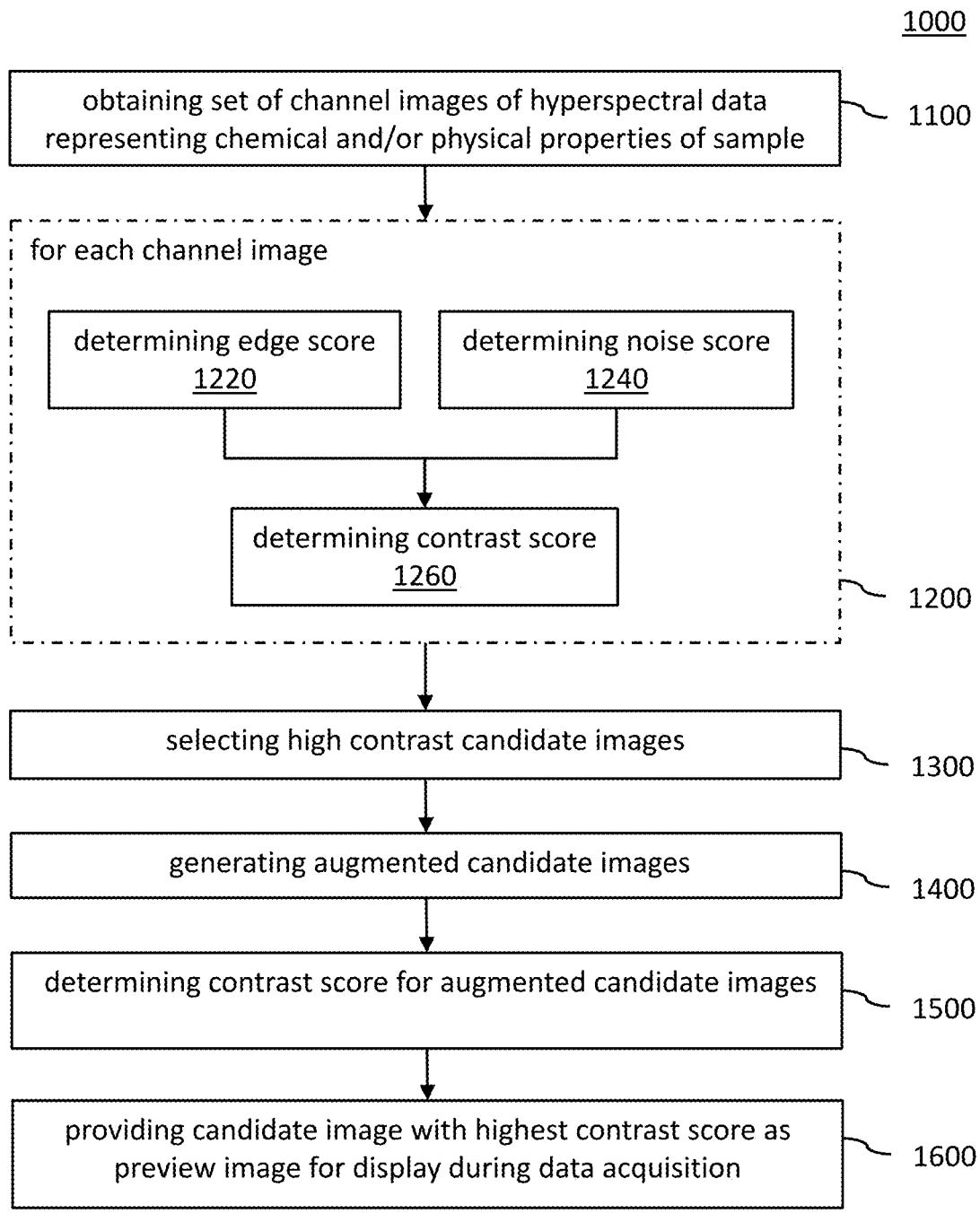
FIG. 2 is a flowchart of a computer-implemented method for real-time preview of hyperspectral data during data acquisition according to an embodiment.

The system 100 implements a plurality of functional modules which are configured to perform various data processing tasks at runtime to generate said real-time preview of the hyperspectral data during data acquisition. The functional modules, which will be described in detail herein, are advantageously implemented in software but may also be implemented by programmable hardware components or ASICS. In the case of using a software implementation, computer-readable instructions of the software are then read into a memory of the system and processed by one or more processors of the system. When the computer-readable instructions are executed at runtime, runtime instances of the respective modules are instantiated and perform the computer-implemented method 1000 of the embodiment as shown in the flowchart of FIG. 2. System 100 is described in more detail in the context of method 1000 and reference numbers of both figures are used in the following description.

System 100 is communicatively coupled to the data source providing the channel images 20* (e.g., spectrometer 200 or an image buffer). That is, system 100 has an interface which is configured to obtain 1100 the set of channel images. The channel images may be continuously received while the data acquisition by the spectrometer 200 is in process when using FPA imaging. In case of using a spectrometer measuring a grid map, the channel images can be obtained from single spectra measured for various fixed sample positions where each fixed position corresponds to a respective pixel in a single channel image at the corresponding wavenumber. A group 110 of functional modules 111, 112 and 113 is configured to determine a contrast score CS* for each obtained channel image. For this purpose, group 110 performs a loop 1200 over all obtained channel images. It is to be noted that the loop 1200 may also be implemented as a plurality of sub-loops which may be executed in parallel where each of the sub-loops processes a distinct subset of the channel images. That is, for each channel image of the set:

edge module 111 determines 1220 an edge score ES* for the currently processed channel image by performing a plurality of convolutions of the channel image with a plurality of edge kernels EK1 to EKm adapted to identify edges for a plurality of image directions. Each convolution results in a corresponding edge filter map. The resulting edge filter maps are aggregated to obtain the edge score ES* for the current channel image.

noise module 112 determines 1240 a noise score NS* for the current channel image based on a noise filter map obtained by performing a convolution of the channel image with a noise kernel NK.

contrast module 113 determines 1260 a contrast score CS* for the current channel image as the ratio of the determined edge score ES* to the respective determined noise score NS* of the current channel image.

That is, the determination of the contrast of each single channel image is based on convolutions of the respective single channel image with a set of pre-defined filters/kernels. It is to be noted that each of the obtained channel images only needs to be processed once to determine a respective edge score. That is, while continuously obtaining channel images, only newly obtained channel images need to be processed by said loop. The number of convolution kernels as well as their shape can be determined based on the dimensionality of the channel images. A common case is hyperspectral data where each single channel image corresponds to a grayscale digital image of the same area of sample 201 with image pixels forming a rectangular grid. An example set of convolutional filters for extracting contrast information is shown in FIGS. 3A to 3D (edge kernels) and FIG. 4 (noise kernel).

Figure 3A:
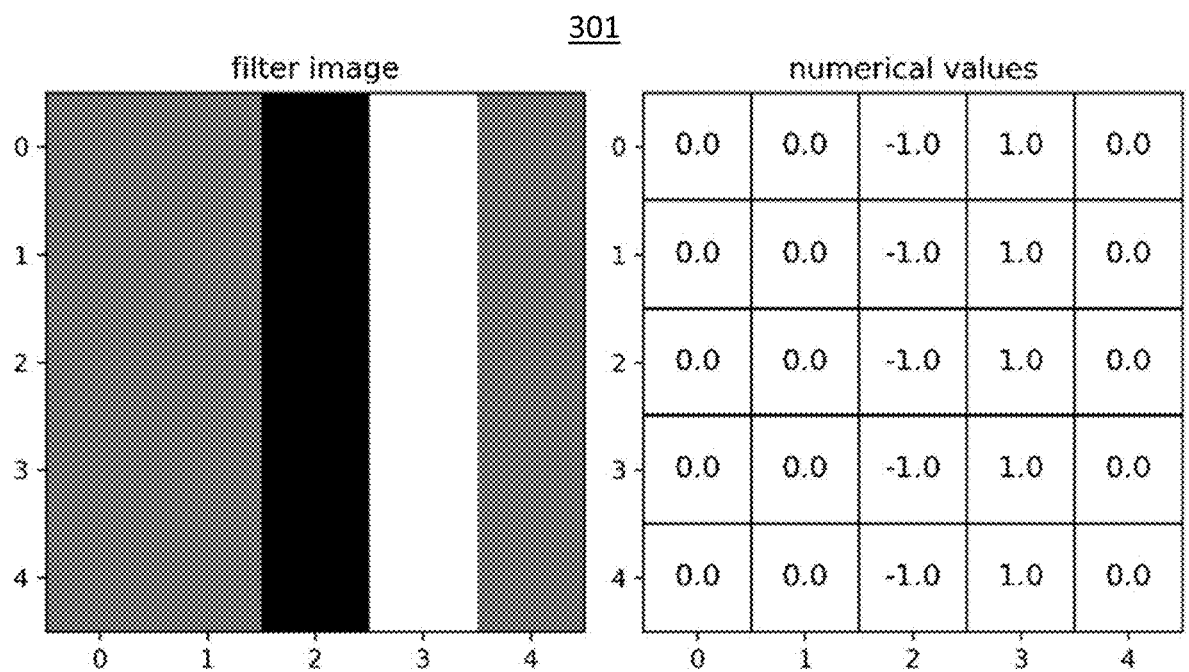
FIGS. 3A to 3D show examples of various edge kernels which can be used with a particular embodiment.
Figure 3B:
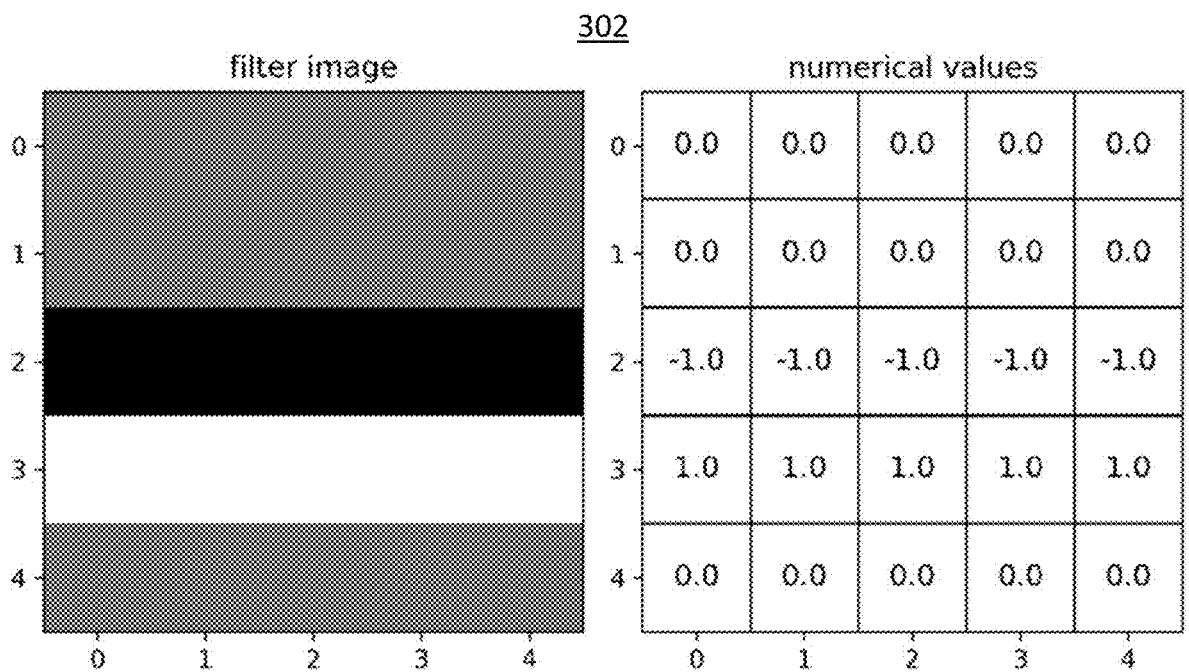
Figure 3C:
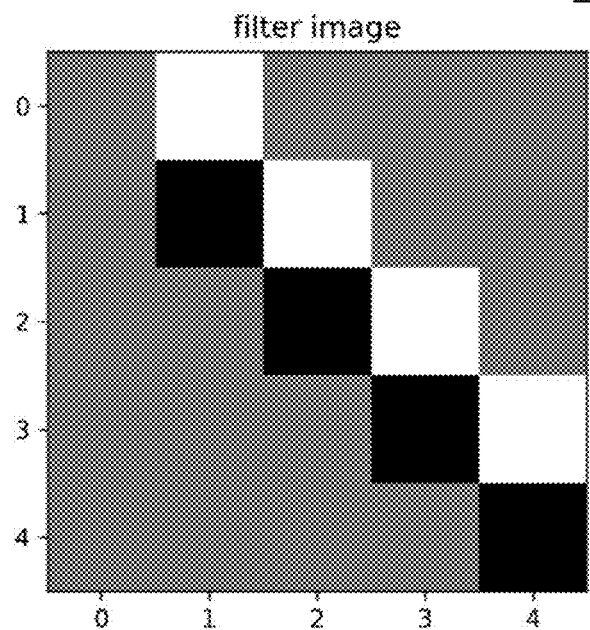
Figure 3D:
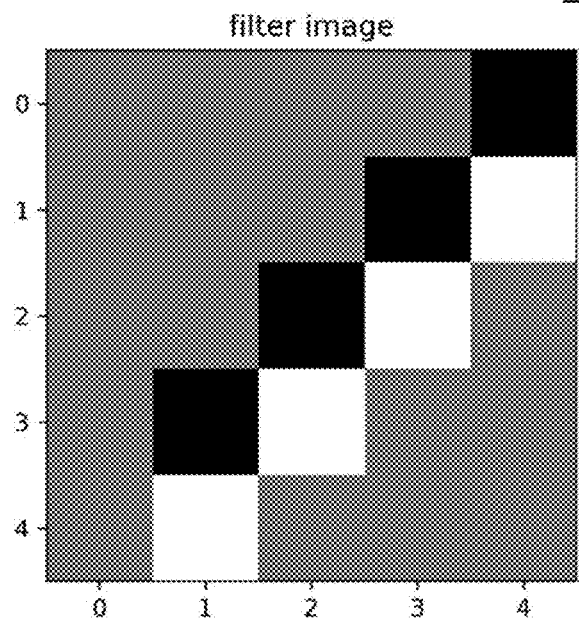
Figure 5A:
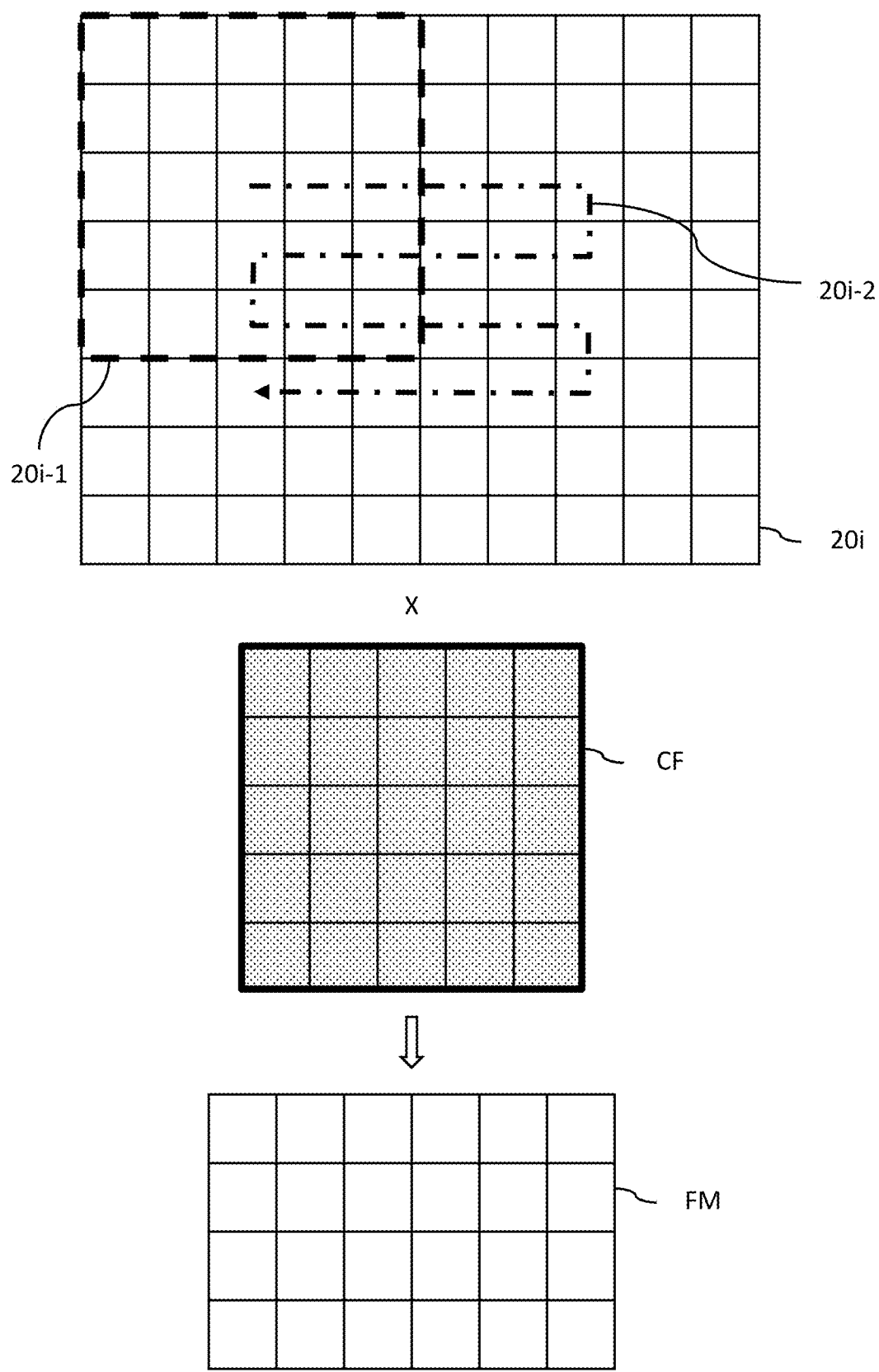
FIG. 5A illustrates the application of a convolution filter to a channel image resulting in a filter map according to an embodiment.

FIGS. 3A to 3D show examples of 5×5 2D filters (2D edge kernels 301 to 304) suitable for determining 1220 the edge score ES*. On the left of each figure, a grey scale filter image is illustrated. On the right of the figure, the corresponding matrix of numerical values is shown. In FIG. 3A, a horizontal edge filter 301 example is shown for identifying horizontal edges. The diagonal black pixels correspond to the numerical value '−1.0', the white pixels correspond to the numerical value '1.0' and the grey pixels represent the numerical value '0'. FIG. 5A illustrates in general how a convolution filter CF is applied to a channel image 20$i$ to perform a convolution 'X' which finally results in a filter map FM. Thereby, the convolution filter CF is multiplied point-wise (pixel-wise) with a matching area 20$i$-1 (indicated by the dashed square) of the channel image 20$i$ and the resulting values are summed up. The resulting sum is then stored in the corresponding pixel of the filter map FM. Advantageously, this operation is performed for the pixels of the channel image 20$i$ which are located inside the channel image 20$i$-1 such that the matching area 20$i$-1 does not exceed the edges of the channel image. These pixels are traversed by the dash-dotted line 20$i$-2. In the example, the pixel where line 20$i$-2 starts indicates the center of the matching area 20$i$-1 which covers the upper left of the channel image 20$i$ is. In this implementation, the resulting filter map FM is smaller than the channel image 20$i$ because a filter value is determined only for the pixels on the path of line 20$i$-2. This guarantees that all and only pixels of the channel image are taken into account when computing the filter map FM. The position of the arrow of line 20$i$-2 indicates the center of the current position of matching area 20$i$-1 (in the example the starting position for the convolution). For channel images that have not been completely acquired (e.g., the spectrometer does not obtain an intensity value for each pixel of the channel images during the measurement process), only pixels of the filter map FM for which the data in the corresponding matching area of the channel image are complete are computed. In the same way, the edge module can perform further convolutions with further edge kernels, such as the vertical edge kernel 302 example in FIG. 3B for identifying vertical edges, the diagonal edge kernel 303 example in FIG. 3C for identifying diagonal edges from the upper left to the lower right, and the anti-diagonal edge kernel 304 FIG. 3D for identifying diagonal edges from the lower left to the upper right. Of course, a person skilled in the art may use other suitable sizes and numerical values for implementing such edge kernels. Further, a skilled person can implement such edge kernels also in the form of filter layers of convolutional neural network which can be trained to obtain respective the respective contrast scores as its output.

In an alternative implementation, the line 20$i$-2 could traverse all pixels of the channel image by filling up pixels of the matching area 20$i$-1 being outside the channel image 20$i$ with '0' values. In the example, when starting with the upper left pixel of the channel image, only the 3×3 pixels in the lower right of the matching area 20$i$-1 would overlap with the channel image. The remaining pixels outside the channel image would need to be filled with artificial values. However, this typically leads to artificial edge effects at the boundaries of the resulting filter map.

For higher dimensional single channel images, additional edge kernels may be needed to cover additional dimensions. Each spatial dimension requires at least one edge kernel. Two diagonal step kernels for each new possible pair of dimensions (e.g., XY, YZ) are to be added. Further, for a p-dimensional single channel image $2^{(p-1)}$ step kernels for each new possible p-tuple of dimensions (e.g., XYZ) can be advantageous. For degrees of freedom that do not correspond to spatial coordinates, other filter kernels may prove more useful.

In one implementation, the edge kernels may be part of a class of filters known as Haar-like features and tilted/extended Haar-like features, respectively, that are widely used for object detection in computer vision. Any subset of these features, and their generalizations, can be used for the purpose of identifying meaningful signals in a 2D image. One key feature of these filter kernels is that the sum of their pixel values amounts to zero (or at least amounts to a value which is close to zero), which means there is no (or very low) contribution to the signal score from regions of constant intensity.

Since structures in a channel image may occur at any scale, in one implementation, the following iterative scheme may be used to obtain the edge score of a single channel image:

Firstly, the edge score is initialized to 0 (there may be a result from an earlier edge score calculation which is erased by the initialization).

Then, the single channel image is accessed and set as "reduced image".

While the size of the reduced image is larger than the size of convolutional edge kernel (the pixel count of the reduced image exceeds the pixel count of the edge kernel in every dimension), perform the following steps:

Convolve the reduced single channel image with each of the edge kernels. The result of convolution with each edge kernel is a filter map. For scoring partially recorded grid maps measured in a whisk-broom fashion during the measurement, the measured pixels can be split at any stage into at most two partially overlapping rectangular regions, for each of which the convolution is applied separately:

A first (and potentially only) rectangular region comprises all completely acquired lines of the grid map.

If the scoring occurs before the end of a line, but after a number of grid points corresponding (equal) to the appropriate pixel size of the filter kernels have been acquired, a second rectangular region comprises those grid points of the current line and the corresponding grid points from a number of previously acquired lines, corresponding to the appropriate pixel size of the filter kernels minus 1.

Sum the squares of the pixel values of the resulting filter maps and add all to the edge score (aggregating the filter maps).

Downsample the reduced image by a factor of 2 in any dimension by summing up the values of adjacent, non-overlapping 2×2 tiles of the reduced image to obtain a new reduced image, and set the reduced image to the new reduced image.

In each iteration of the "While"-loop, the new reduced image is generated by aggregating the pixel values of adjacent 2×2 tiles of the current reduced image. The process is repeated as long as the size of the convoluted image is larger than the size of the edge kernel.

Figure 4:
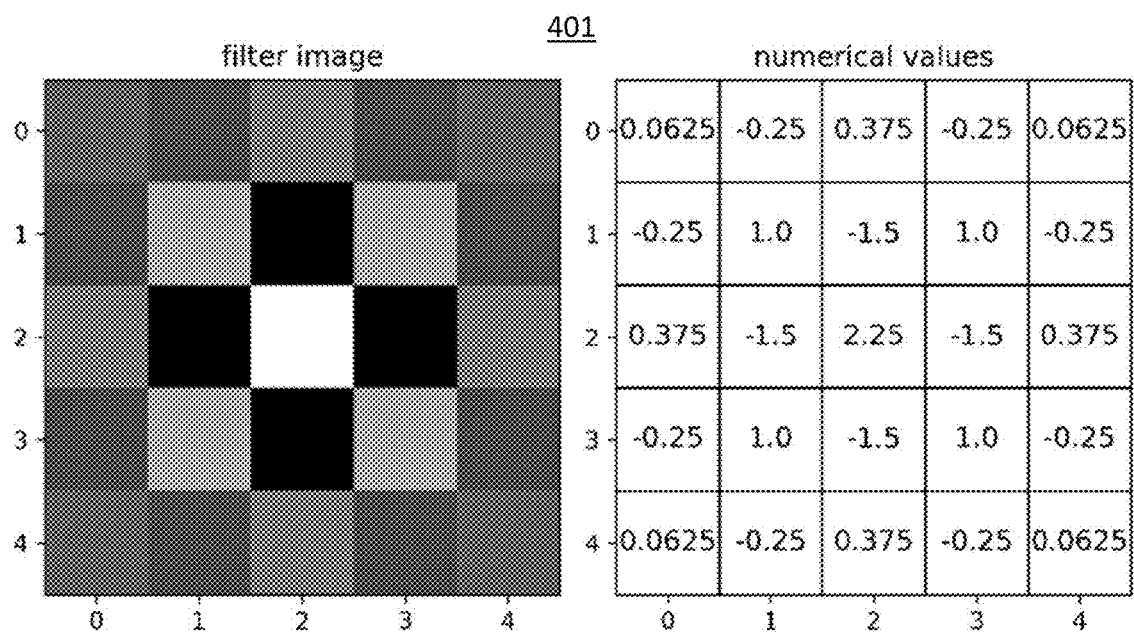
FIG. 4 shows an example of a noise kernel which can be used with a particular embodiment.

FIG. 4 shows an example of a 5×5 noise kernel 401. The noise score of a channel image may be determined 1240 by convolution of the measured channel image with such a noise kernel, and then summing up the squares of the pixel values of the resulting filter map.

The choice of noise kernel 401 for the noise score is arbitrary, but advantageously complies with the following guiding principles:

i. Functioning as a high-pass filter in horizontal and vertical direction (and potentially other directions).
ii. The numerical values of the filter pixels sum to zero.
iii. The arrangement of the numerical values is centro-symmetric.
iv. The total number of non-zero entries is small compared to the size of the channel image.

A straightforward way to generate a noise kernel that satisfies these conditions is via the direct product of two 1D kernels corresponding to an even low-order discrete derivative. Condition iv is a result of assuming the noise is zero-mean. Choosing a too large number of non-zero entries would cancel out noise contributions and the noise kernel would no longer be suitable to estimate the noise level. For this reason, noise filtering—unlike signal filtering—is advantageously carried out at the smallest scale. That is, no downsampling with aggregation is performed.

The role of the noise score is two-fold:
Noisy and fragmented patterns are penalized.
The contrast score becomes scale invariant, i.e., multiplying all measured values of a single channel image with a constant factor results in the same contrast score.

Scale invariance also means that all filters can be multiplied by the same constant non-zero factor without changing the final result.

The resulting contrast score of a single channel image is then determined 1260 via the formula F1:

$$\text{Contrast score} = \text{edge score}/\text{noise score} \quad (F1)$$

The edge score and the noise score can be computed during data acquisition, in that they can be updated using newly added data (new recently obtained channel images) without re-evaluating the previously evaluated portions of the hyperspectral data.

A selection module 120 is configured to select 1300 from the set 20, in descending order of associated contrast scores, a predefined number of channel images as a plurality of high contrast candidate images 20hcc.

Figure 8A:
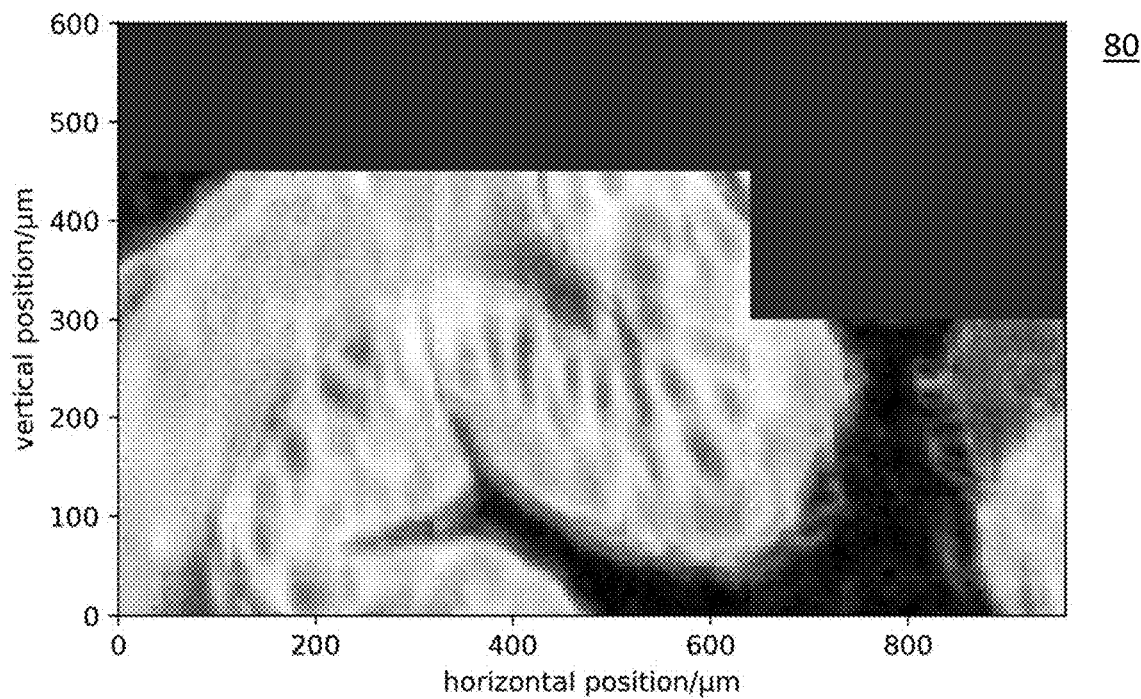
FIGS. 8A to 8F are examples of candidate images for the real-time preview.

In the basic embodiment, a high score module 140 provides 1600 the candidate image with the highest contrast score from the plurality of high contrast candidate images 20hcc as preview image for display during data acquisition. FIG. 8A shows an example of such a candidate image 80 with the highest contrast score.

In the embodiment of FIG. 1, an augmentation module 130 is configured to generate 1400, one or more augmented candidate images 20a by applying one or more augmentation methods to all channel images 20 or (dependent on the augmentation method) to the plurality of high contrast candidate images 20hcc. An example of a simple augmentation method is generating an averaged candidate image as augmented candidate image by averaging the candidate images of the selected plurality of high contrast candidate images 20hcc. More complex augmentation methods are described further down below. Further, module 130 determines 1500 a contrast score for each augmented candidate image. Finally, the high score module provides 1600, from the plurality of high contrast candidate images 20hcc and the one or more augmented candidate images 20a, the candidate image 20p with the highest contrast score as preview image for display during data acquisition. That is, in this embodiment, an augmented candidate image may result in a higher contrast score than the selected high contrast candidate image with the highest contrast score (e.g., candidate image 80 in FIG. 8A) so that the augmented candidate image likely provides the highest informational value and is therefore used as the preview image.

Figure 7:
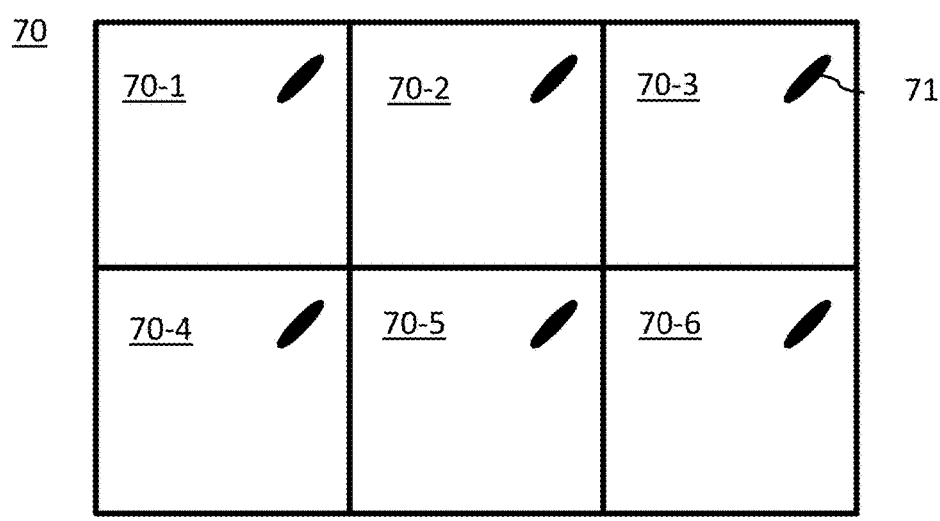
FIG. 7 illustrates channel image tiles with an imaging artefact in the context artefact suppression according to an embodiment.

FIG. 7 illustrates an optional embodiment for suppressing artifacts in channel images. Some hyperspectral datasets are acquired via an imaging sensor such that a focal plane array (FPA) collects multiple spectra simultaneously instead of only one spectrum at a time. While the area sampled during a single FPA acquisition is usually larger than in the single spectrum detection case, in most cases multiple acquisitions (patches) are required to cover the whole area of interest. Spatially adjacent acquisition patches are then digitally merged to form a hyperspectral dataset of the whole area of interest.

Hyperspectral data that have been acquired in this way often show imaging artefacts. Diagram 70 shows an artefact 71 that is repeated in each acquired patch image 70-1 to 70-6 at the same position. There are two main types of artefacts that are advantageously suppressed when the data under investigation is/was acquired by an imaging sensor:

Visible edges at the boundary between two acquisition patches: Such visible edges are caused by inhomogeneous illumination across the sensor area during a single measurement. An edge filter (as described above) applied across multiple acquisition patches would detect an edge, which would, inaccurately, be interpreted as a geometric feature. To avoid this, no edge detection is carried out across the boundaries of different acquisition patches.

Periodically repeated features from image sensor defects and contamination on the sensor or the optical elements: For some types of measurements, such as attenuated total reflection (ATR), this type of artefact can potentially dominate any other signal. To prevent this type of artefact from being misinterpreted as signal, the mutual spatial correlation of all acquisition patches is calculated (independently for each spectral channel). If c is the minimum correlation between any pair of patches, then the edge score of the respective channel image may be adjusted by a factor $(1.0-c)^{2.5}$. If all acquisition patches for a given channel image are identical, then c=1 and the resulting factor is 0.

Figure 6A:
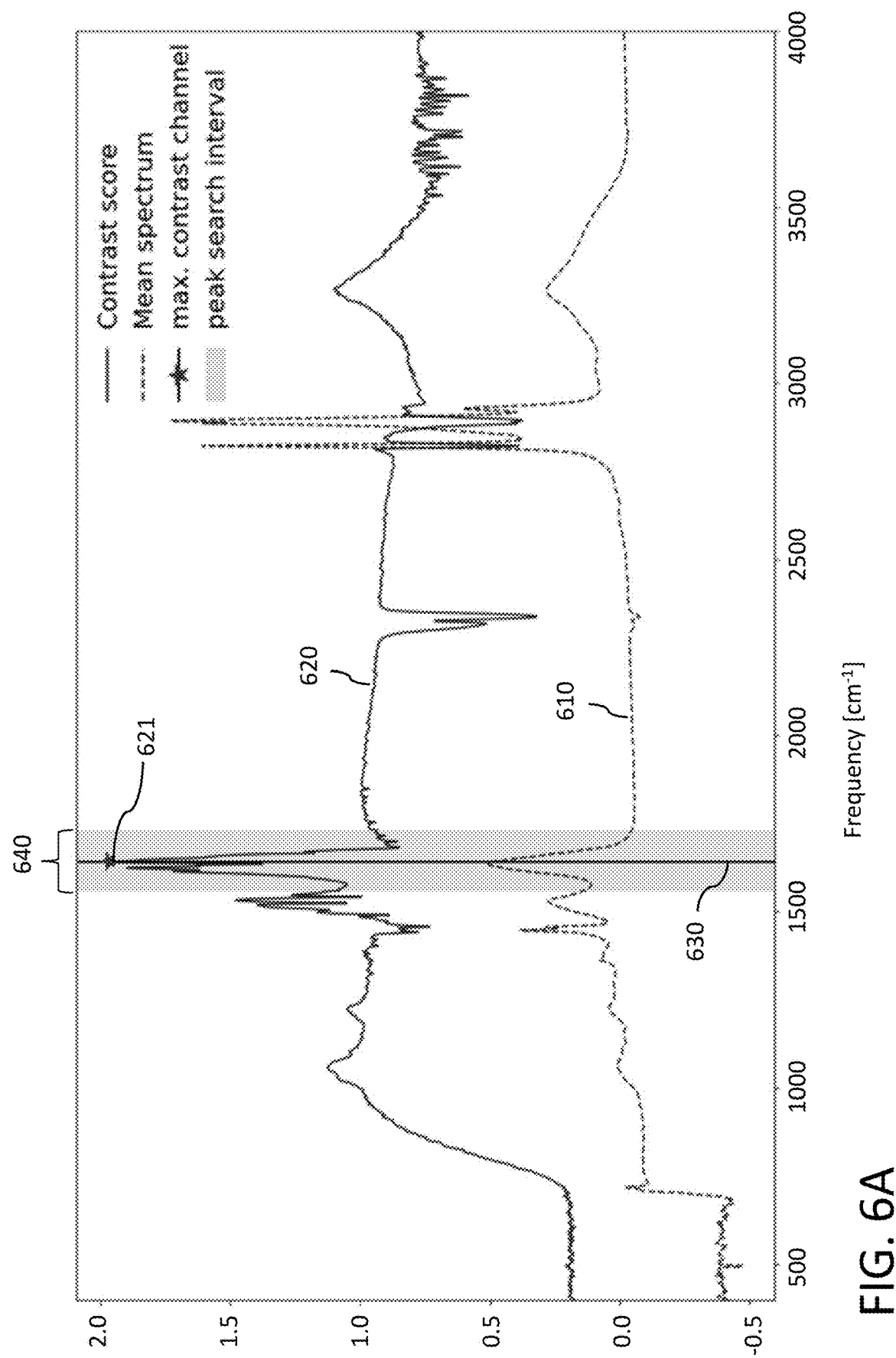
FIGS. 6A, 6B illustrate peak selection in a mean spectrum in the context of an example augmentation method for the generation of augmented candidate images.
Figure 6B:
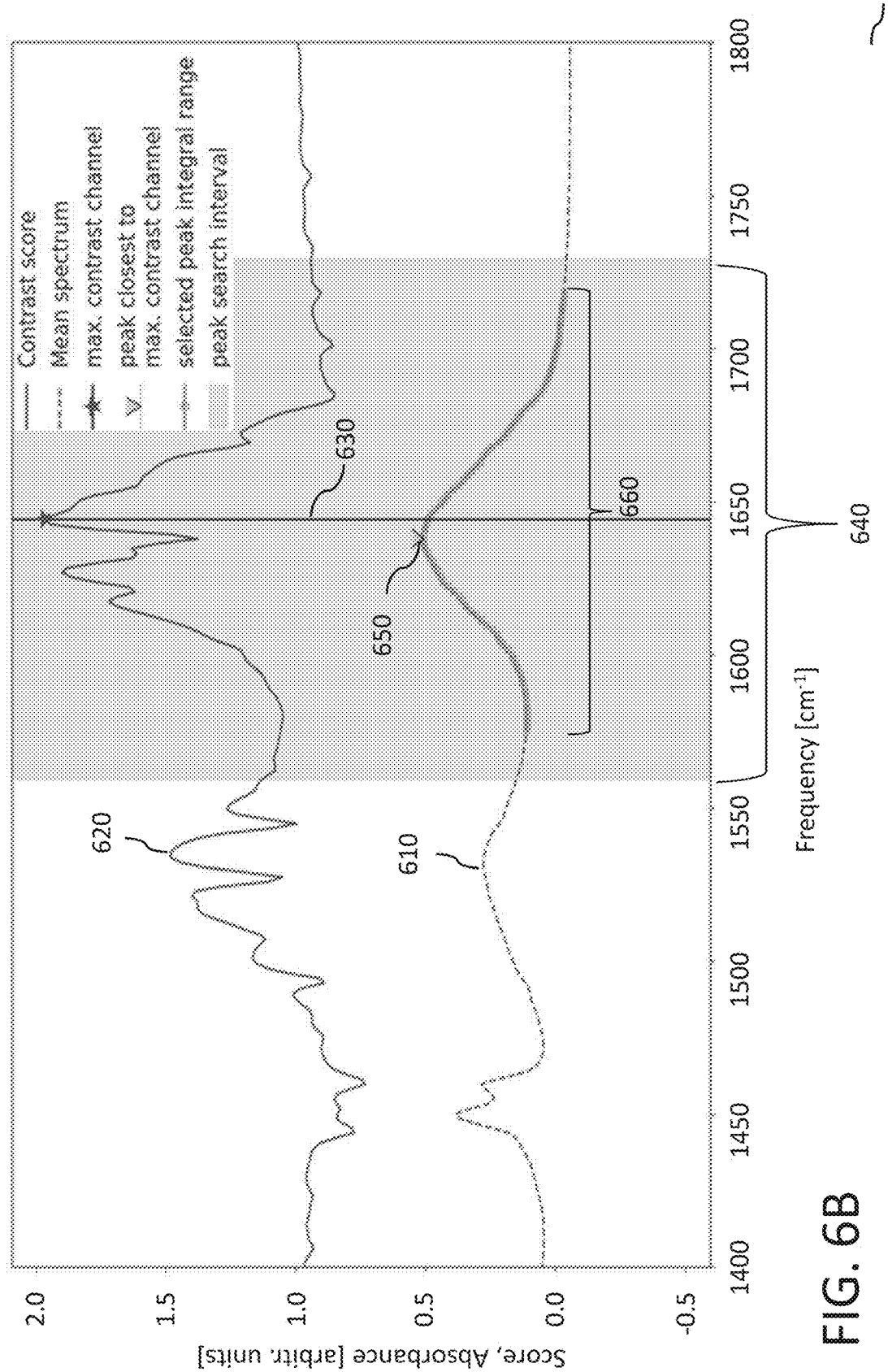
Figure 6C:
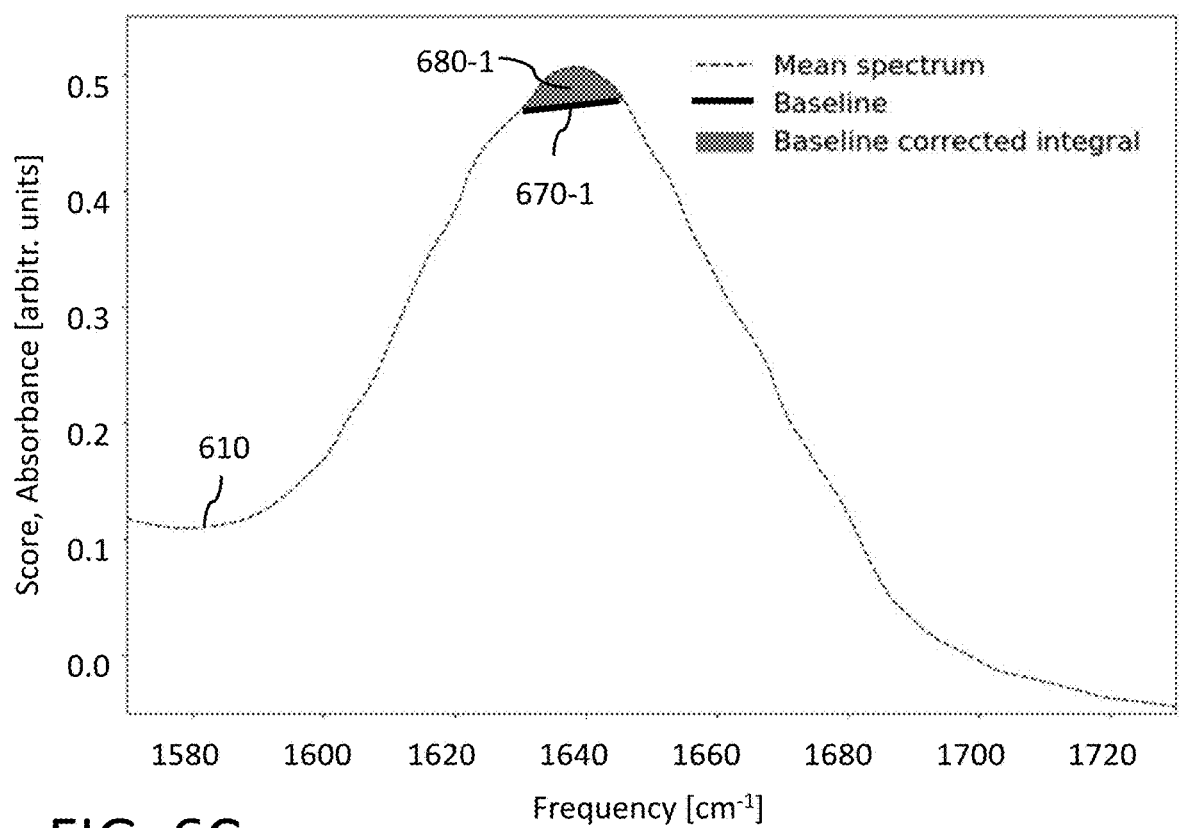
FIGS. 6C to 6E illustrate the computation of a baseline corrected integral for a pre-defined range around a selected peak of the mean spectrum.
Figure 6D:
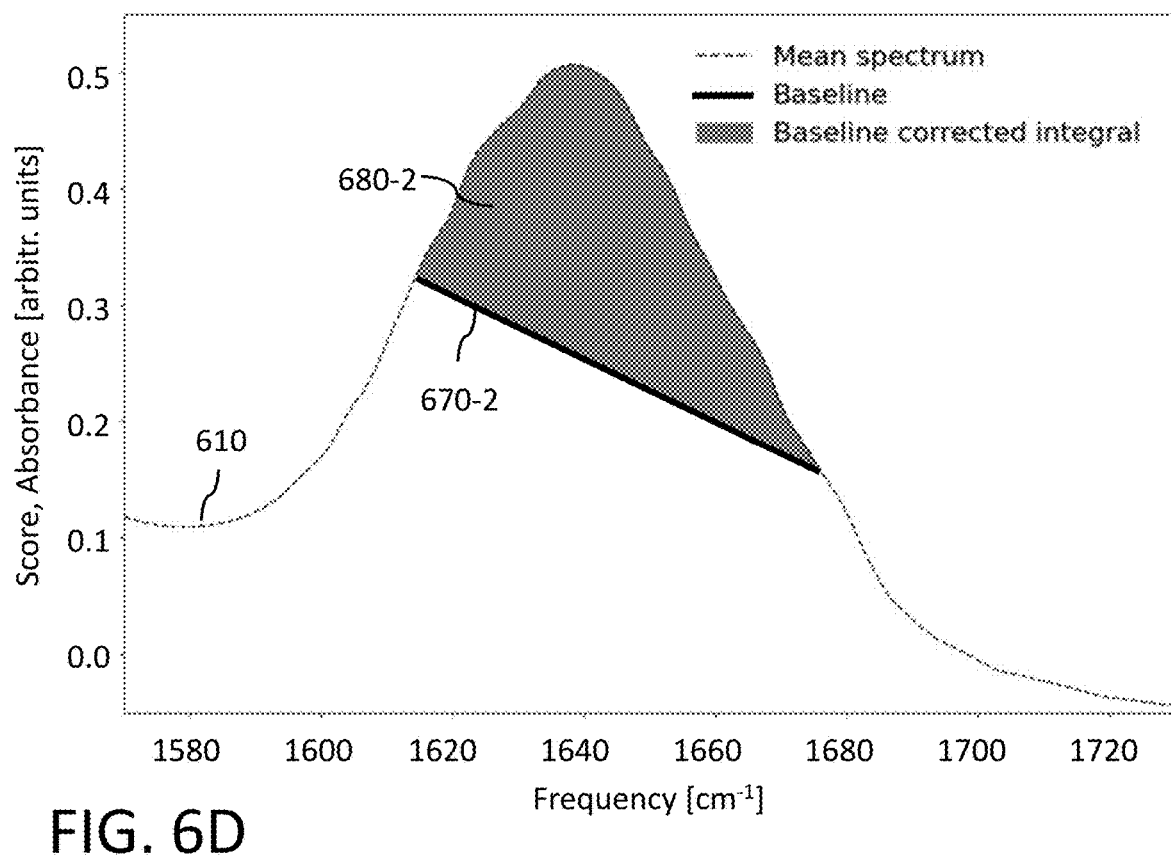
Figure 6E:
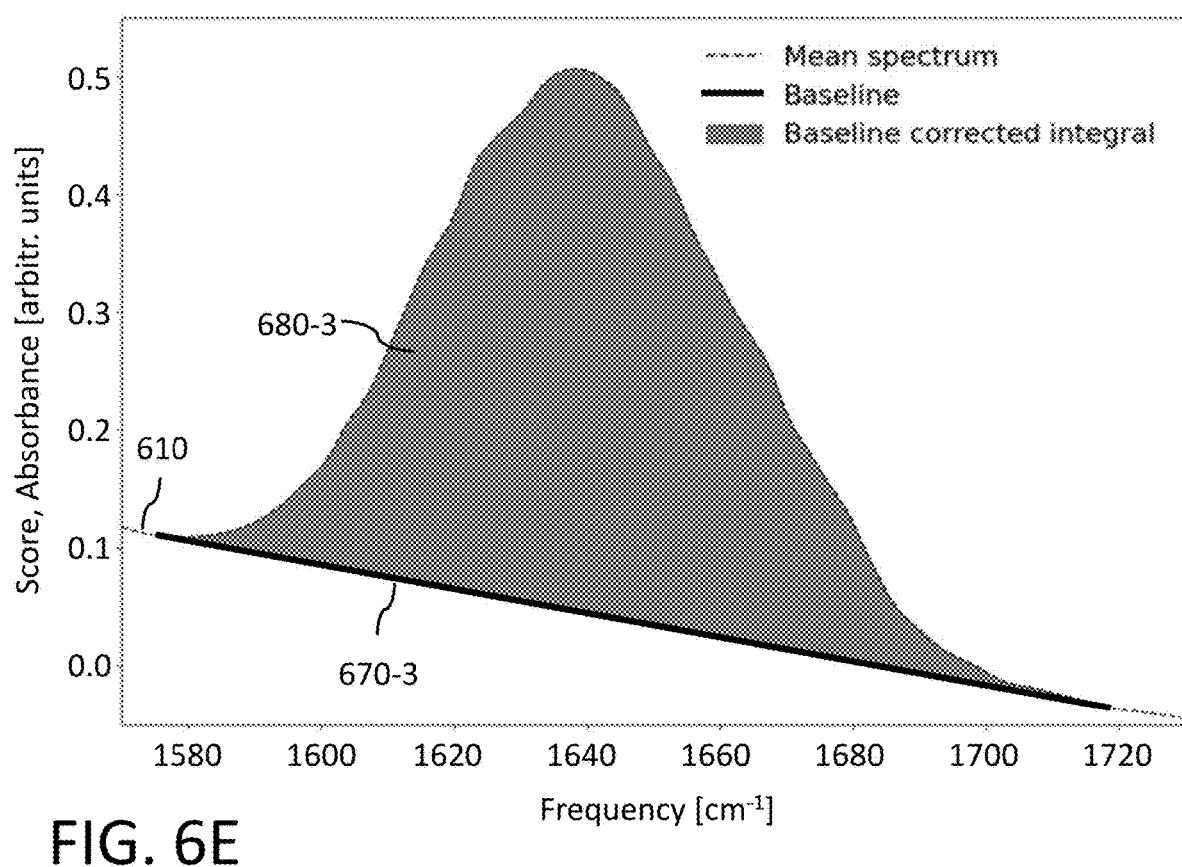
Figure 8B:
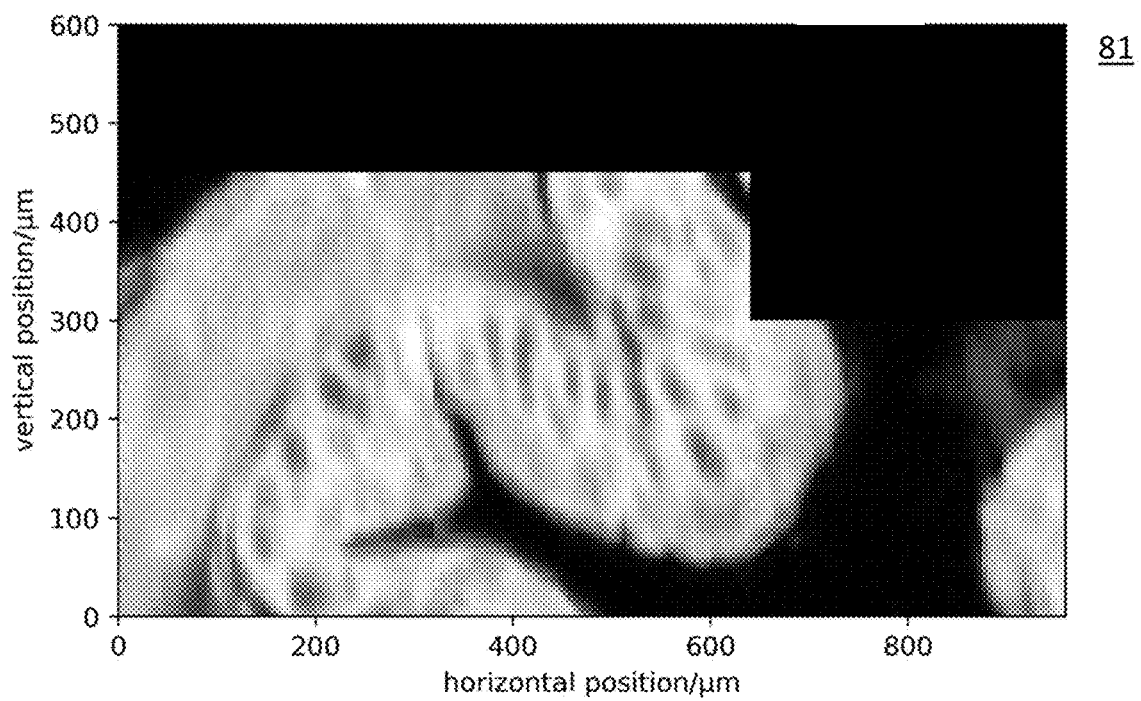

FIGS. 6A to 6E illustrate a further augmentation method which can be implemented by the augmentation module 130 for generating an augmented candidate image. FIG. 6A illustrates a mean spectrum 610 (dashed line) which has been generated by the augmentation module by averaging all spectra acquired via the set of channel images. That is, this augmentation method is using all acquired channel images as input (and not just the previously determined high contrast candidate images). Further, the contrast score 620 of the channel images is shown. In the mean spectrum 610, the augmentation module now searches for one or more peaks within a predefined wavenumber range 640 (grey shaded bar) centered at the wavenumber 630 (frequency 1644 cm$^{-1}$) associated with the channel image with the highest contrast score 621. FIG. 6B is a magnification of the spectra in FIG. 6A in the frequency range 1400 cm$^{-1}$ to 1800 cm$^{-1}$. If one or more peaks are identified within the predefined range 640 of wavenumbers, the augmentation module selects the means spectrum peak 650 which is closest to the channel image at wavenumber 630 with the highest contrast score. The augmentation module then computes a baseline corrected integral across an integration range 660 of the selected peak 650 for each spectrum acquired via the set channel images. The integration range 660 is determined such that the baseline corrected integral has a local maximum. FIGS. 6C to 6E illustrate steps in the computation of the baseline corrected integral 680-3 (grey area in FIG. 6E). In FIG. 6C an initial step of the computation starts with generating a baseline 670-1 between two points of the mean spectrum which are left and right to the selected mean spectrum peak and computing the respective baseline corrected integral 680-1 for the baseline 670-1. FIG. 6B illustrates a later step in the computation where the baseline 670-2 is set between two points of the selected mean spectrum peak which have a greater distance from the peak than the points which defined the baseline 670-1 in the initial step. The later step computes the baseline corrected integral 680-2. The augmentation module continues with such computations by increasing the distance of the baseline end points from the peak as long as the baseline corrected integral increases. FIG. 6E shows the final computation step where the baseline integral 680-3 has reached its maximum. If the baseline 670-3 would be further extended by shifting the endpoints on the mean spectrum 610 even further away from the selected peak, the baseline corrected integral would not become larger anymore. This defines the end of the computation. The baseline corrected integral 680-3 computed across the determined integration range is then used to generate a baseline corrected integral augmented candidate image. An example of such a baseline corrected integral augmented candidate image 81 is shown in FIG. 8B.

In the following, more details regarding the generation of the baseline corrected integral augmented candidate image are explained. A person skilled in the art knows that a hyperspectral dataset can be viewed as a set of spatially aligned 2D images stacked along the spectral axis, or as a collection of single spectra acquired on a 2D meshgrid. Regardless of the point of view or acquisition technique, the data in a hyperspectral dataset can be arranged in a 3D array where two indices correspond to spatial axes and one index corresponds to the spectral axis. With this in mind, an implementation of an example algorithm for the selection of the peak integral range is given below:

1. Compute vector m, the mean spectrum of all (currently) acquired spectra:
   a. compute the vector sum of all (currently) acquired spectra or, equivalently, sum up all the pixel values for each single channel image
   b. divide the obtained sum by the number of spectra/pixels that have been acquired
2. Find local maxima of the calculated mean spectrum and estimate their significance:
   a. Calculate a smoothed 1$^{st}$ derivative of m using a Savitzky-Golay filter of window size 7 and polynomial order of 3.
   b. Find the position on the spectral axis, x, and the signal value, e, of local extrema at positions where the sign of the smoothed derivative changes. One obtains a series of pairs $(x_i, e_i)|i=1, \ldots, n$ ordered by their positions $x_i$ on the spectral axis $x_1 < x_2 < \ldots < x_n$.
   c. Compute the significance s of each extreme value pair $(x_i, e_i)$:
      i. Compute a value $r_i$ at each local extreme value $e_i$:
         1. If the extreme value has two neighbouring extreme values: subtract the mean of the neighbouring extreme values $e_{i-1}$ and $e_{i+1}$ from the extreme value $e_i$ and take the absolute value $r_i = |e_i - 0.5*e_{i-1} - 0.5*e_{i+1}|$
         2. If the extreme value has only one neighbouring extreme value: subtract the neighbouring values $e_{i\pm1}$ extreme value $e_i$ and take the absolute value $r_i = |e_i - e_{i\pm1}|$
         3. If there is only one extreme value and thus the extreme value has no neighbouring extreme values: compute dl, the maximum absolute difference between the extreme value, $e_i$, and the mean value spectrum to the left of $x_i$, $m_{|<xi}$, as well as the maximum absolute difference between $e_i$ and the mean value spectrum to the right of $x_i$, $m_{|<xi|}$, and take the mean value: $r_i=0.5*\max(|e_{i-|<xi|}|)+0.5*\max(|e-m_{|<xi|}|)$ ii. Divide each value $r_i$ by the signal range of the mean spectrum m to obtain the significance of the extreme value, $s_i$: $s_i=r_i/(\max(m)-\min(m))$ iii. Form extreme value triplets $(x_i, e_i, s_i)|i=1, \ldots, n$ 3. Retain only extreme value triplets that correspond to local maxima
4. Evaluate the location of the extreme value triplets w.r.t. the location of the maximum contrast score channel, $x_c$
   a. If there are one or more extreme value triplets whose significance $s_i$ is above a predefined threshold (0.2) and whose location $x_i$ is within a predefined range, w, (85 cm$^{-1}$) of the location of the maximum contrast channel on the spectral axis, $x_c$, i.e. $|x_i-x_c|<=w$, then the extreme/maximum value triplet whose location is closest to $x_c$ is selected as the peak triplet, p: $p=\mathrm{argmin}_i(|x_i-x_c|)$
   b. If no extreme value triplet is within the predefined range of $x_c$, then the mean value of a predefined number of highest contrast images is computed instead.
5. Starting from the peak location, $x_p$, grow a region around $x_p$ channel by channel until the baseline corrected integral of m attains a local maximum. The integration range is bounded from above by a predefined value (850 cm$^{-1}$).
   a. The baseline corrected integral is a weighted sum of the elements of m whose support is within the integration range.
   b. The weight for each element in the interior of the range is dx, where dx is the grid spacing on the frequency axis (the frequency difference between neighbouring spectral channels).
   c. The weight for the two elements at the boundary of the integration range is $0.5*dx*(2-N)$, where N is the number of channels within the integration range
6. Compute the baseline corrected integral across the found range for each spectrum in the data set to generate the augmented candidate image.

Figure 8C:
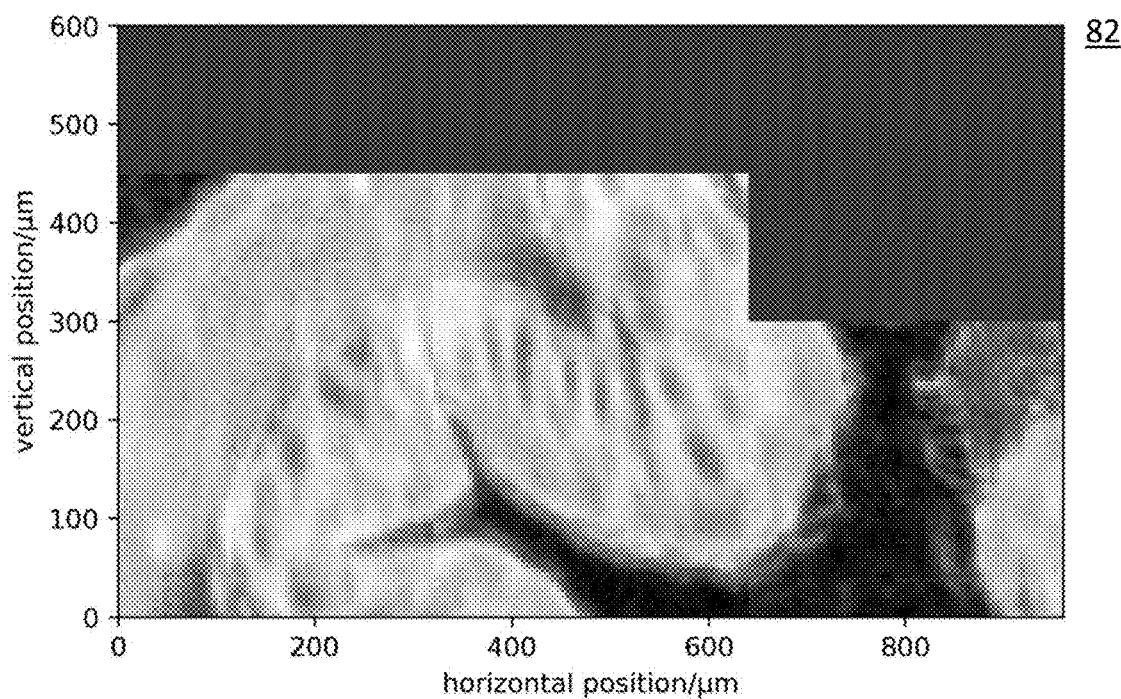
Figure 8D:
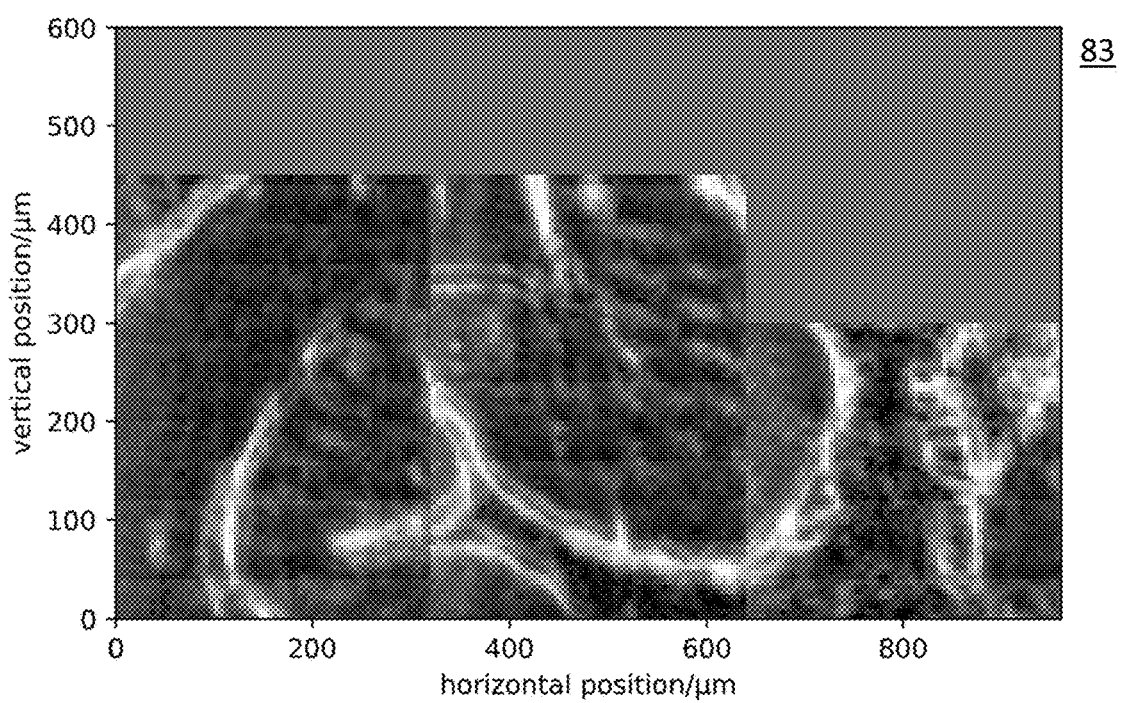
Figure 8E:
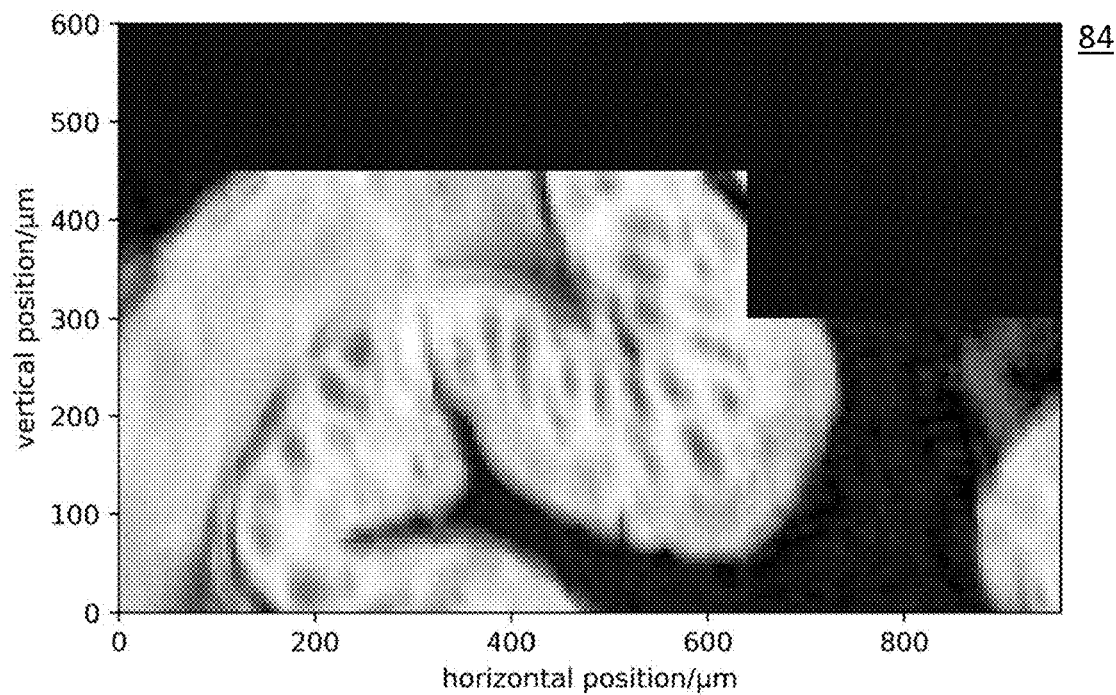
Figure 8F:
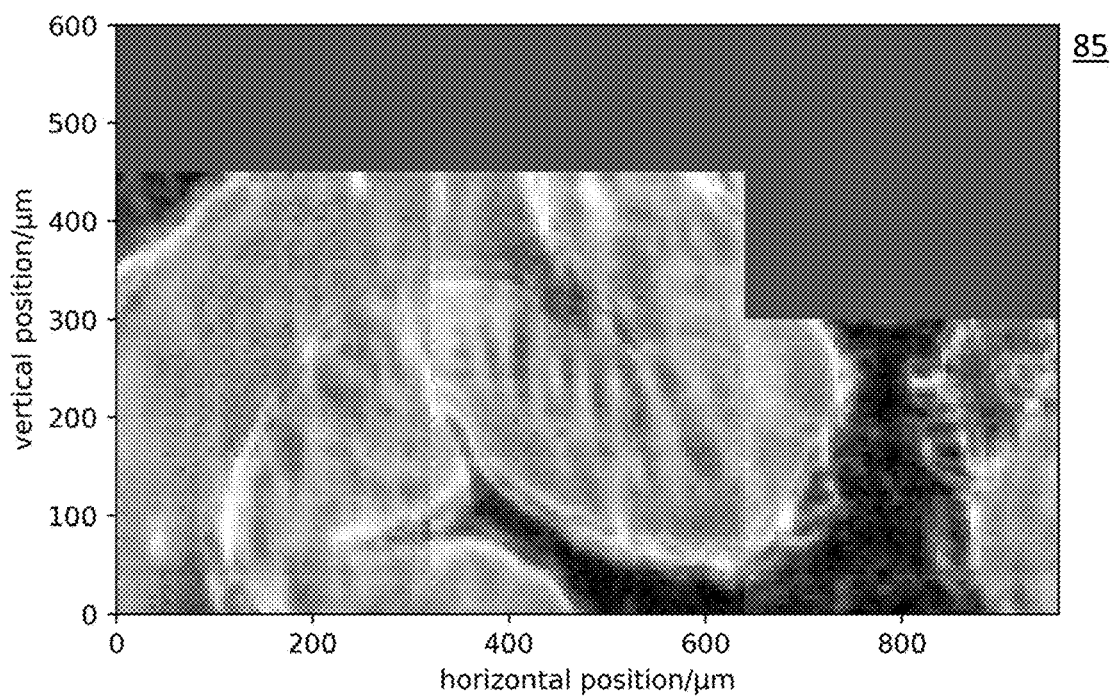

FIGS. 8C to 8F are examples of augmented candidate images generated by using principal component analysis. FIG. 8C shows an augmented candidate image 82 which is derived as a score map of the first principal component of 3.33% top contrast score quantile. FIG. 8D shows an augmented candidate image 83 which is derived as a score map of the second principal component of 3.33% top contrast score quantile. FIG. 8E shows an augmented candidate image 84 which is derived as the sum of the first and second principal component score maps. FIG. 8F shows an augmented candidate image which is derived as the difference between the first and second principal component score maps.

Figure 5C:
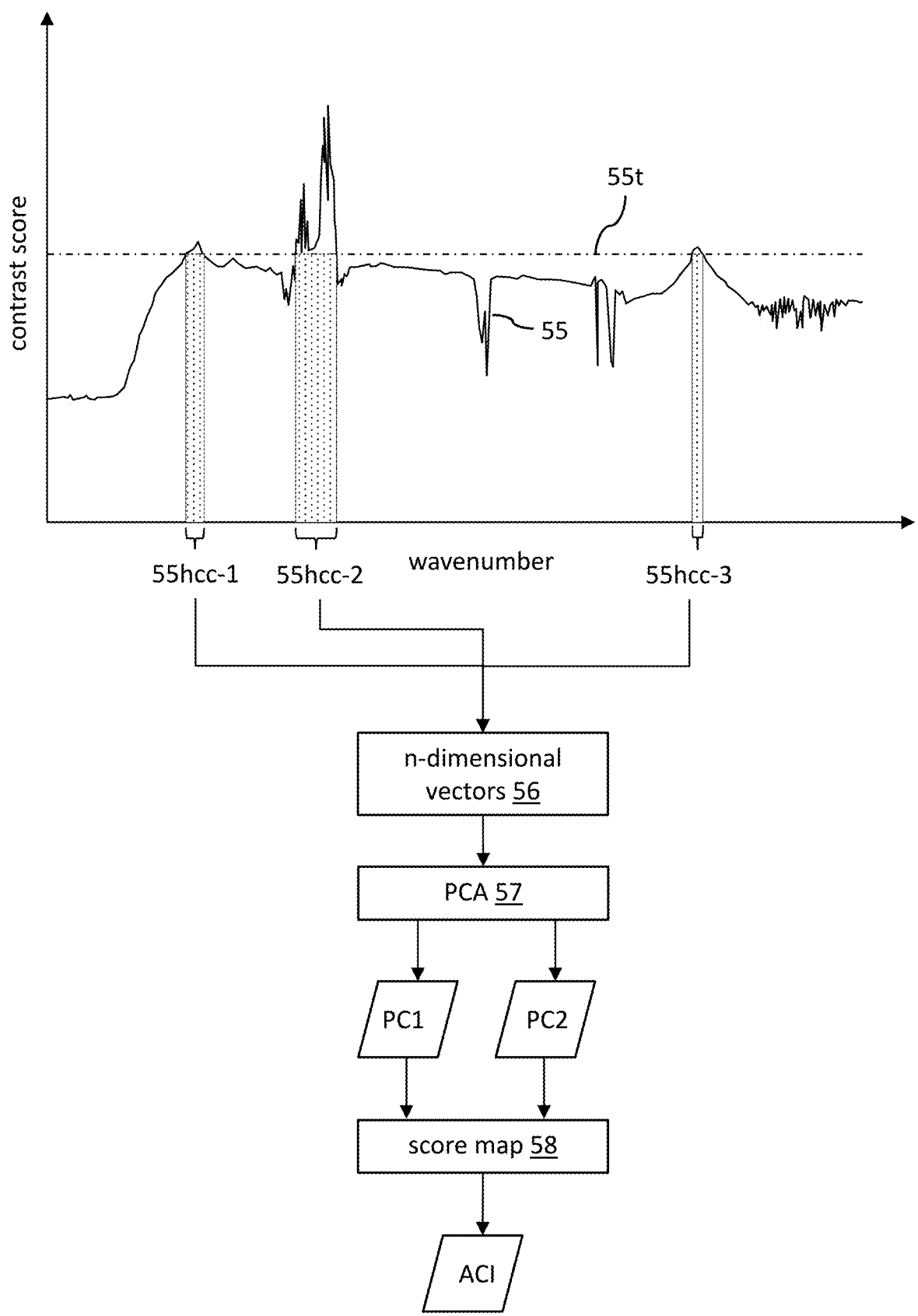
FIG. 5C illustrates an example augmentation method for the generation of augmented candidate images using principal component analysis.

FIG. 5C illustrates an augmentation method based on principal component analysis. After having performed the contrast score computation for all channel images of the hyperspectral dataset (cf. FIG. 2, loop 1200), the contrast score 55 is known for all channels of the hyperspectral dataset (i.e., all corresponding wavenumbers). The selection module then extracts the predefined number of high contrast candidates. In the example, the channel images with a contrast score above threshold 55t are selected as the high contrast candidates. Threshold 55t is not a fixed value but dynamically set by sorting the contrast scores in descending order and setting the threshold below the last contrast score of the predefined number of top-ranking contrast scores. The predefined number of high contrast candidates can also be defined as a percentage of the total number of channel images (e.g., the upper 3% of the contrast score values of all channel images). In the example, the channel images in the wavenumber ranges 55hcc-1, 55hcc-2 and 55hcc-3 belong to the selected high contrast candidate images. That is, the hyperspectral dataset is reduced to n selected high contrast candidate images AS illustrated by FIG. 5B, the slices of intensity values along fixed spatial coordinate indices ("pixels" 51-1, 51-2, . . . , 51-n) correspond to reduced digital spectra, each of which can be represented as an n-dimensional vector 51. The set of n-dimensional vectors comprises all vectors traversing the selected high contrast candidate images along fixed spatial coordinate indices. FIG. 5B illustrates a subset of vectors 51, 51', 52", and 51''' traversing the pixels of the upper pixel row of each selected channel image. Replicating this subset for each pixel row provides the entire set of n-dimensional vectors 56. That is, the size of set 56 (cf. FIG. 5C) is the number of pixels in a channel image.

A principal component analysis module PCA 57 then computes a loading vector for a first principal component PC1 of the set of n-dimensional vectors 56 as the n-dimensional unit vector that maximizes the variance when said set of vectors is projected onto the loading vector. A corresponding score map 58 is the projection of the set of vectors 56 onto the corresponding loading vector, which generates a 2D grayscale image (e.g., image 82 of FIG. 8C) if the set of vectors 56 is arranged on a rectangular grid. The score map 58 can be interpreted as a weighted sum of the selected high contrast candidate images (in wavenumber ranges 55hcc-1, 55hcc-2 and 55hcc-3), where the weights are given by the elements of the n-dimensional loading vector. A deflated dataset is obtained by subtracting the loading vector times its corresponding score (projection) from each vector of the dataset. Subsequent principal components (second PC2, third, fourth etc.) can then be obtained by repeated application of this procedure on the deflated dataset. The score map 58 of the first principal component PC1 is then used as augmented candidate image ACI.

In an alternative augmentation method, the score map of the second principal component PC2 is used as augmented candidate image ACI. FIG. 8D shows an example image 83 obtained as the score map of the second principal component PC2.

As described earlier, further augmentation methods can compute the sum of the contrast score maps of the first PC1 and second principal components PC2 as augmented candidate image ACI (e.g., image 84 in FIG. 8E), or can compute the difference between the contrast score maps of the first PC1 and second principal components PC2 as augmented candidate image ACI (e.g., image 85 in FIG. 8F).

Figure 9:
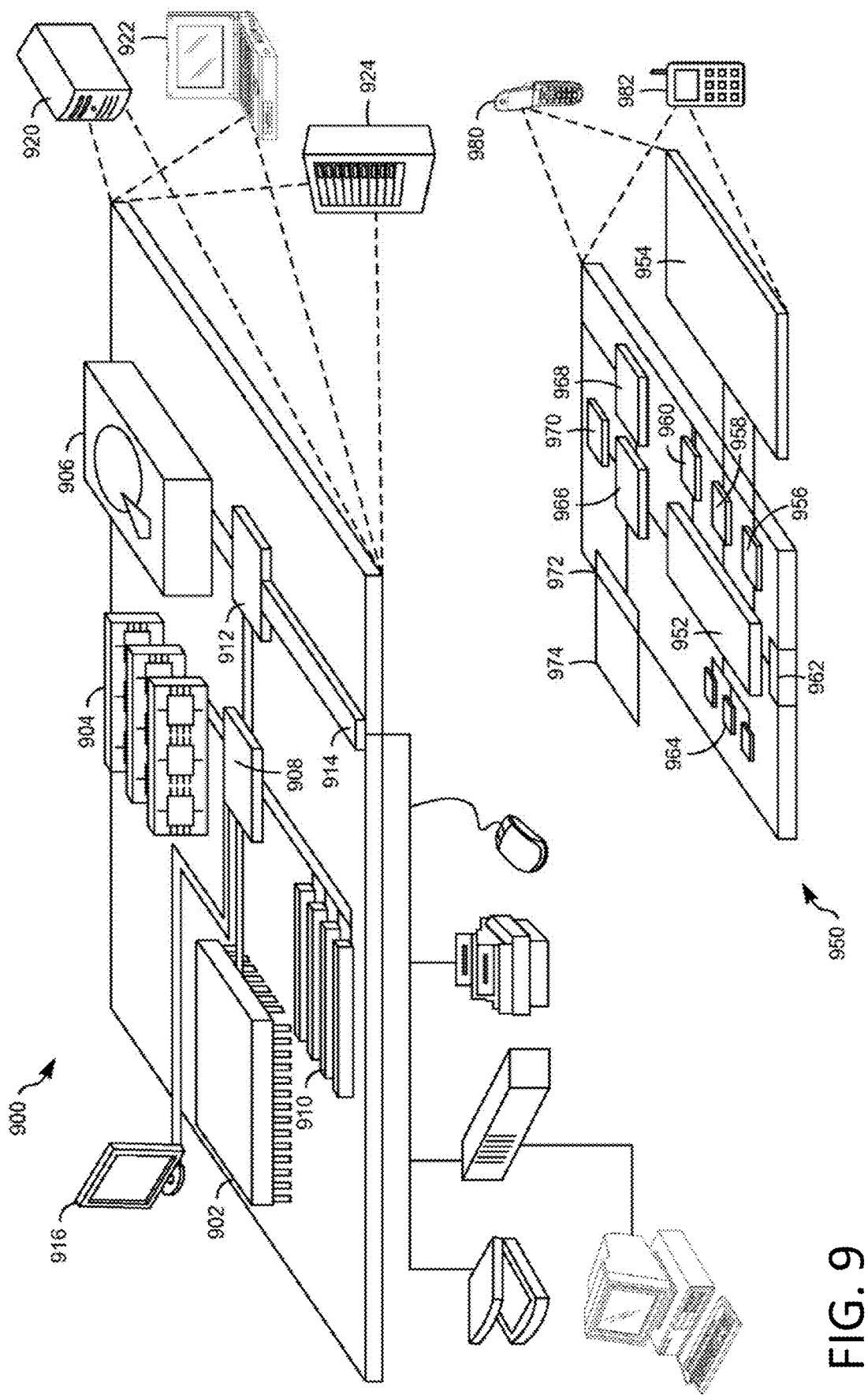
FIG. 9 is a diagram that shows an example of a generic computer device and a generic mobile computer device which may be used with the techniques described herein.

FIG. 9 is a diagram that shows an example of a generic computer device 900 and a generic mobile computer device 950, which may be used with the techniques described here. In some embodiments, computing device 900 may relate to system 100 (cf. FIG. 1). Computing device 950 is intended to represent various forms of mobile devices, such as personal digital assistants, cellular telephones, smart phones, and other similar computing devices. In the context of this disclosure the computing device 950 may provide I/O means for a user to interact with the computing device 900 (e.g., for displaying the provided preview images to a user). The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low-speed interface 912 connecting to low-speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high-speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low-speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

The invention claimed is:

1. A computer-implemented method for real-time preview of hyperspectral data during data acquisition, the hyperspectral data representing chemical and/or physical properties of a sample and represented by a set of channel images, each channel image associated with a particular wavelength, frequency, or energy per quantum corresponding to a particular wavenumber, the method comprising:
   obtaining the set of channel images;
   for each channel image of the set:
      determining an edge score for the channel image by: performing a plurality of convolutions of the channel image with a plurality of edge kernels adapted to identify edges for a plurality of image directions, each convolution resulting in a corresponding edge filter map, and aggregating the resulting edge filter maps to obtain the edge score;
      determining a noise score for the channel image based on a noise filter map obtained by performing a convolution of the channel image with a noise kernel;
      determining a contrast score for the channel image as a ratio of the determined edge score to the respective determined noise score;
   selecting from the set, in descending order of associated contrast scores, a predefined number of channel images as a plurality of high contrast candidate images;
   generating one or more augmented candidate images by applying one or more augmentation methods to all channel images or to the plurality of high contrast candidate images, and determining a contrast score for each augmented candidate image; and
   providing, from the plurality of high contrast candidate images and the one or more augmented candidate images, the candidate image with a highest contrast score as preview image for display during data acquisition.

2. The method of claim 1, wherein generating one or more augmented candidate images comprises:
   generating a mean spectrum by averaging all spectra acquired via the set of channel images;
   searching for one or more peaks in the mean spectrum within a predefined wavenumber range, the predefined wavenumber range centered at the wavenumber associated with the channel image with the highest contrast score;

if one or more peaks are identified within the predefined range of wavenumbers, selecting the peak being closest to the channel image with the highest contrast score, and computing a baseline corrected integral across an integration range of the selected peak, wherein the integration range is determined such that the baseline corrected integral has a local maximum; and computing the baseline corrected integral across the determined integration range for each spectrum acquired via the set to generate a baseline corrected integral augmented candidate image.

3. The method of claim 1, wherein generating one or more augmented candidate images comprises:

generating an averaged candidate image as augmented candidate image by averaging the candidate images of the selected plurality of high contrast candidate images.

4. The method of claim 1, wherein generating one or more augmented candidate images comprises:

generating, from the selected high contrast candidate images for each channel image pixel, an n-dimensional vector with n being the number of selected high contrast candidate images, and vector components representing intensity values of a corresponding pixel across the selected high contrast candidate images;

computing a first principal component of the n-dimensional vectors wherein the components of a resulting loading vector of the first principal component represent corresponding weights of the respective high contrast candidate images, the loading vector of the first principal component of a set of n-dimensional vectors being an n-dimensional unit vector maximizing a variance when said vectors are projected onto the loading vector; and generating a first principal component augmented candidate image reflecting a contrast score map of the first principal component by computing a weighted sum of the selected high contrast candidate images using the corresponding weights.

5. The method of claim 4, wherein generating one or more augmented candidate images comprises:

generating, from the selected high contrast candidate images for each channel image pixel, an n-dimensional vector with n being the number of selected high contrast candidate images, and vector components representing intensity values of a corresponding pixel across the selected high contrast candidate images;

computing a second principal component of the n-dimensional vectors wherein the components of a resulting loading vector of the second principal component represent corresponding weights of the respective high contrast candidate images; and generating a second principal component augmented candidate image reflecting a contrast score map of the second principal component by computing a weighted sum of the selected high contrast candidate images using the corresponding weights.

6. The method of claim 5, wherein generating one or more augmented candidate images comprises:

computing the sum of the contrast score maps of the first principal component and the second principal component to obtain an augmented candidate image.

7. The method of claim 5, wherein generating one or more augmented candidate images comprises:

computing a difference between the contrast score maps of the first principal component and the second principal component to obtain an augmented candidate image.

8. The method of claim 1, wherein a particular channel image of the hyperspectral data corresponds to pixels of a rectangular greyscale digital image representing an area of the sample, and a particular pixel has a same position relative to the sample in all channel images.

9. The method of claim 8, wherein the hyperspectral data is obtained with a focal plane array and each channel image is composed of at least two tiles.

10. The method of claim 9, wherein the edge score, the noise score and the contrast score are determined for each tile separately to avoid contrast artifacts at boundaries of neighboring tiles.

11. The method of claim 9, wherein a pairwise mutual spatial correlation of all tiles of each channel image for each spectral channel is determined and the edge score of each channel image is adjusted by a factor $(1-c)^k$, where c is a minimum pairwise mutual spatial correlation of that channel image, and k is in a range of 0 to 5, preferably 2.5.

12. The method of claim 9, wherein the contrast score of a previous tile is calculated during acquisition of a current tile, thereby iteratively calculating the contrast score of a whole channel image.

13. The method of claim 1, wherein the set of channel images is a set of infrared images or Raman images obtained from the sample.

14. A non-transitory computer readable medium comprising computer-readable instructions that, when loaded into a memory of a computing device and processed by one or more processors of the computing device, cause the computing device to execute the following operations for real-time preview of hyperspectral data during data acquisition, the hyperspectral data reflecting chemical and/or physical properties of a sample and being obtained as a set of channel images, each channel image associated with a particular wavelength:

obtaining the set of channel images;

for each channel image of the set:

determining an edge score for the channel image by: performing a plurality of convolutions of the channel image with a plurality of edge kernels adapted to identify edges for a plurality of image directions, each convolution resulting in a corresponding edge filter map, and aggregating the resulting edge filter maps to obtain the edge score;

determining a noise score for the channel image based on a noise filter map obtained by performing a convolution of the channel image with a noise kernel;

determining a contrast score for the channel image as a ratio of the determined edge score to the respective determined noise score;

selecting from the set, in descending order of associated contrast scores, a predefined number of channel images as a plurality of high contrast candidate images;

generating one or more augmented candidate images by applying one or more augmentation methods to all channel images or to the plurality of high contrast candidate images, and determining a contrast score for each augmented candidate image; and providing, from the plurality of high contrast candidate images and the one or more augmented candidate images, the candidate image with a highest contrast score as preview image for display during data acquisition.

15. The computer readable medium of claim 14, wherein instructions for generating one or more augmented candidate images further comprise instructions for an augmentation method to cause the computing device to execute the following method steps:
generating a mean spectrum by averaging all spectra acquired via the set of channel images;
searching for one or more peaks in the mean spectrum within a predefined wavenumber range, the predefined wavenumber range centered at the wavenumber associated with the channel image with the highest contrast score;
if one or more peaks are identified within the predefined range of wavenumbers, selecting the peak being closest to the channel image with the highest contrast score, and computing a baseline corrected integral across an integration range of the selected peak, wherein the integration range is determined such that the baseline corrected integral has a local maximum; and
computing the baseline corrected integral across the determined integration range for each spectrum acquired via the set to generate a baseline corrected integral augmented candidate image.

16. The computer readable medium of claim 14, wherein instructions for generating one or more augmented candidate images further comprise instructions for a further augmentation method to cause the computing device to execute the following method steps:
generating, from the selected high contrast candidate images for each channel image pixel, an n-dimensional vector with n being the number of selected high contrast candidate images, and vector components representing intensity values of a corresponding pixel across the selected high contrast candidate images;
computing a first principal component of the n-dimensional vectors wherein the components of a resulting loading vector of the first principal component represent corresponding weights of the respective high contrast candidate images, the loading vector of the first principal component of a set of n-dimensional vectors being an n-dimensional unit vector maximizing a variance when said vectors are projected onto the loading vector; and
generating an augmented candidate image reflecting a contrast score map of the first principal component by computing a weighted sum of the selected high contrast candidate images using the corresponding weights.

17. A computer system for real-time preview of hyperspectral data during data acquisition, the hyperspectral data reflecting chemical and/or physical properties of a sample and being represented by a set of channel images, each channel image associated with a particular wavelength, frequency, or energy per quantum corresponding to a particular wavenumber, the system comprising a memory storing computer-readable instructions implementing a plurality of functional modules, and one or more processors of the computer system for executing the computer-readable instructions to instantiate said functional modules for performing the following functions at runtime of the computer system:
obtaining, by using an interface, the set of channel images;
for each channel image of the set:
determining, by an edge module, an edge score for the channel image by:
performing a plurality of convolutions of the channel image with a plurality of edge kernels adapted to identify edges for a plurality of image directions, each convolution resulting in a corresponding edge filter map, and aggregating the resulting edge filter maps to obtain the edge score;
determining, by a noise module, a noise score for the channel image based on a noise filter map obtained by performing a convolution of the channel image with a noise kernel;
determining, by a contrast module, a contrast score for the channel image as a ratio of the determined edge score to the respective determined noise score;
by a selection module, selecting from the set, in descending order of associated contrast scores, a predefined number of channel images as a plurality of high contrast candidate images;
generating, by an augmentation module, one or more augmented candidate images by applying one or more augmentation methods to all channel images or to the plurality of high contrast candidate images, and determining a contrast score for each augmented candidate image; and
by a high score module, providing, from the plurality of high contrast candidate images and the one or more augmented candidate images, the candidate image with a highest contrast score as preview image for display during data acquisition.

18. The computer system of claim 17, the system storing further computer-readable instructions implementing a particular augmentation function of the augmentation module, for performing the following augmentation method at runtime of the computer system:
generating a mean spectrum by averaging all spectra acquired via the set of channel images;
searching for one or more peaks in the mean spectrum within a predefined wavenumber range, the predefined wavenumber range centered at the wavenumber associated with the channel image with the highest contrast score;
if one or more peaks are identified within the predefined range of wavenumbers, selecting the peak being closest to the channel image with the highest contrast score, and computing a baseline corrected integral across an integration range of the selected peak, wherein the integration range is determined such that the baseline corrected integral has a local maximum; and
computing the baseline corrected integral across the determined integration range for each spectrum acquired via the set to generate a baseline corrected integral augmented candidate image.

19. The computer system of claim 17, the system storing further computer-readable instructions implementing a further augmentation function of the augmentation module, for performing a further augmentation method at runtime of the computer system that includes:
generating, from the selected high contrast candidate images for each channel image pixel, an n-dimensional vector with n being the number of selected high contrast candidate images, and vector components representing intensity values of a corresponding pixel across the selected high contrast candidate images;
computing a first principal component of the n-dimensional vectors wherein the components of a resulting loading vector of the first principal component represent corresponding weights of the respective high contrast candidate images, the loading vector of the first principal component of a set of n-dimensional vectors being an n-dimensional unit vector maximizing a variance when said vectors are projected onto the loading vector; and generating an augmented candidate image reflecting a contrast score map of the first principal component by computing a weighted sum of the selected high contrast candidate images using the corresponding weights.

* * * * *